US012568500B2

(12) United States Patent
Cheng et al.

(10) Patent No.: US 12,568,500 B2
(45) Date of Patent: Mar. 3, 2026

(54) SIGNALING FOR ACTIVATION OF A BANDWIDTH PART

(71) Applicant: Qualcomm Incorporated, San Diego, CA (US)

(72) Inventors: Peng Cheng, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 446 days.

(21) Appl. No.: 17/769,355

(22) PCT Filed: Nov. 6, 2020

(86) PCT No.: PCT/CN2020/126985
§ 371 (c)(1),
(2) Date: Apr. 15, 2022

(87) PCT Pub. No.: WO2021/088954
PCT Pub. Date: May 14, 2021

(65) Prior Publication Data
US 2023/0164792 A1     May 25, 2023

(30) Foreign Application Priority Data
Nov. 7, 2019     (WO) ................ PCT/CN2019/116159

(51) Int. Cl.
*H04W 72/23*         (2023.01)
(52) U.S. Cl.
CPC ................................. *H04W 72/23* (2023.01)
(58) Field of Classification Search
CPC ..... H04W 72/23; H04W 76/27; H04W 76/28; H04W 76/15; H04W 72/0453; H04L 5/0053; H04L 5/001
See application file for complete search history.

(56) References Cited

U.S. PATENT DOCUMENTS

2019/0014564 A1*  1/2019  Lee ...................... H04L 5/0053
2019/0103954 A1   4/2019  Lee et al.
(Continued)

FOREIGN PATENT DOCUMENTS

CN       106105143 A     11/2016
CN       109586881 A     4/2019
(Continued)

OTHER PUBLICATIONS

3GPP TSG RAN WG1 Meeting #98bis Chongqing, China, ;Source: Intel Corporation Title: Discussion on fast SCell activation and deactivation ; R1-1910682; Oct. 14-20, 2019 (Year: 2019).*
(Continued)

*Primary Examiner* — Edan Orgad
*Assistant Examiner* — Malick A Sohrab
(74) *Attorney, Agent, or Firm* — Holland & Hart LLP /Qualcomm

(57)             ABSTRACT

Methods, systems, and devices for wireless communications are described. The described techniques provide signaling formats to cause a UE to switch to an active BWP in a secondary cell (SCell) secondary cell group (SCG). The techniques may be used when the UE is connected to a secondary node on a dormant BWP such that the UE connects to the secondary node on the active BWP. The UE may receive, from a master node, downlink control information (DCI) indicating a transition to an active BWP for the communication link with the secondary node. The UE may then perform a communication with the secondary node on the active bandwidth part in accordance with the DCI. The DCI may include SCell or SCG bitmaps, extra bits that signal to the UE that an activation corresponds to a SCG, and/or RNTIs that signal to the UE that the activation corresponds to a SCG.

20 Claims, 14 Drawing Sheets

(56) References Cited

U.S. PATENT DOCUMENTS

| | | | | |
|---|---|---|---|---|
| 2019/0124558 | A1 | 4/2019 | Ang et al. | |
| 2019/0141546 | A1 | 5/2019 | Zhou et al. | |
| 2019/0215808 | A1 | 7/2019 | Ye et al. | |
| 2019/0297571 | A1* | 9/2019 | Jose | H04W 52/0216 |
| 2019/0342944 | A1* | 11/2019 | Chatterjee | H04W 80/08 |
| 2019/0373549 | A1* | 12/2019 | Amin | H04W 52/0235 |
| 2020/0313833 | A1* | 10/2020 | Yi | H04L 5/001 |
| 2021/0021397 | A1* | 1/2021 | Kim | H04W 72/0453 |
| 2021/0028914 | A1* | 1/2021 | Jin | H04W 8/22 |
| 2021/0029772 | A1* | 1/2021 | Islam | H04L 1/1896 |
| 2022/0022281 | A1* | 1/2022 | Wang | H04W 52/02 |
| 2022/0116923 | A1* | 4/2022 | Kim | H04L 5/0098 |
| 2022/0167449 | A1* | 5/2022 | Wang | H04L 5/001 |
| 2022/0295522 | A1* | 9/2022 | Park | H04W 72/1268 |

FOREIGN PATENT DOCUMENTS

| | | | |
|---|---|---|---|
| CN | 109788558 | A | 5/2019 |
| CN | 109997396 | A | 7/2019 |
| CN | 110324132 | A | 10/2019 |
| WO | WO-2019183175 | A1 | 9/2019 |

OTHER PUBLICATIONS

Huawei et al., "CR on BWP Switch TCI State before MAC Activation", 3GPP TSG-RAN4 Meeting #92bis, R4-1911871, 3rd Generation Partnership Project (3GPP), Mobile Competence Centre, 650, Route Des Lucioles, F-06921 Sophia-antipolis Cedex, vol. RAN WG4, No. Chongqing, China, Oct. 13, 2019-Oct. 17, 2019, 3 Pages, Oct. 4, 2019, XP051806616, p. 2.

Qualcomm Incorporated: "Fast SCG and SCell Activation", 3GPP TSG-RAN WG1 #98, R1-1909287, 3GPP, Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 17, 2019, pp. 1-11, XP051765892, 2.1

Fast SCell Activation/ Deactivation, 2.2 SCell Dormancy, 2.3 Usage of fast SCell activation and dormant BWP, 2.2.1 Dormant BWP for SCell, line 3-line 5.

Supplementary European Search Report—EP20883859—Search Authority—Munich—Nov. 20, 2023 (200347EP).

Ericsson: "Reduced Latency Seen Management for NR CA", 3GPP TSG-RAN WG1 #98bis, R1-1911015, Oct. 20, 2019 (Oct. 20, 2019), 9 Pages, sections 1, 2.2, 5.

Intel Corporation: "Discussion on Fast SCell Activation and Deactivation", 3GPP TSG RAN WG1 Meeting #98bis, R1-1910682, Oct. 20, 2019 (Oct. 20, 2019), 6 Pages, section 3.

International Search Report and Written Opinion—PCT/CN2020/126985—ISA/EPO—Feb. 4, 2021.

International Search Report and Written Opinion—PCT/CN2019/116159—ISA/EPO—Jul. 29, 2020.

Nokia: et al., "Efficient CA Design", 3GPP TSG RAN WG1 Meeting RAN1#98bis, R1-1910604, Oct. 20, 2019 (Oct. 20, 2019), 6 Pages, section 2.1.

Qualcomm Incorporated, et al, "Discussion on Fast SCell Activation based on RAN1/RAN4 reply LS ", 3GPP TSG RAN WG2 Meeting #107b, R2-1912195, Chongqing, China, Sep. 14-18, 2019 Sep. 18, 2019 (Sep. 18, 2019), pp. 3-5, pp. 1-15.

Qualcomm Incorporated: "Fast SCell Activation and SCell Dormancy", 3GPP TSG-RAN WG1 #98bis, 3GPP Draft, R1-1911139, Fast SCell Activation and SCell Dormancy, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 5, 2019 (Oct. 5, 2019), XP051808862, 18 pages, Retrieved from the Internet: URL: https://ftp.3gpp.org/tsg_ran/WG1_RL1/TSGR1_98b/Docs/R1-1911139.zip, R1-1911139 Fast SCell activation and SCell dormancy.docx [retrieved on Oct. 5, 2019] pp. 1, 5, pp. 9-12, p. 1-p. 17.

ZTE Corporation: "Discussion on Low Latency SCell Activation", R1-1910109, 3GPP TSG RAN WG1 Meeting #98bis, Chongqing, China, Aug. 14-20, 2019, Aug. 20, 2019 (Aug. 20, 2019) sections 1-6, pp. 1-7.

* cited by examiner

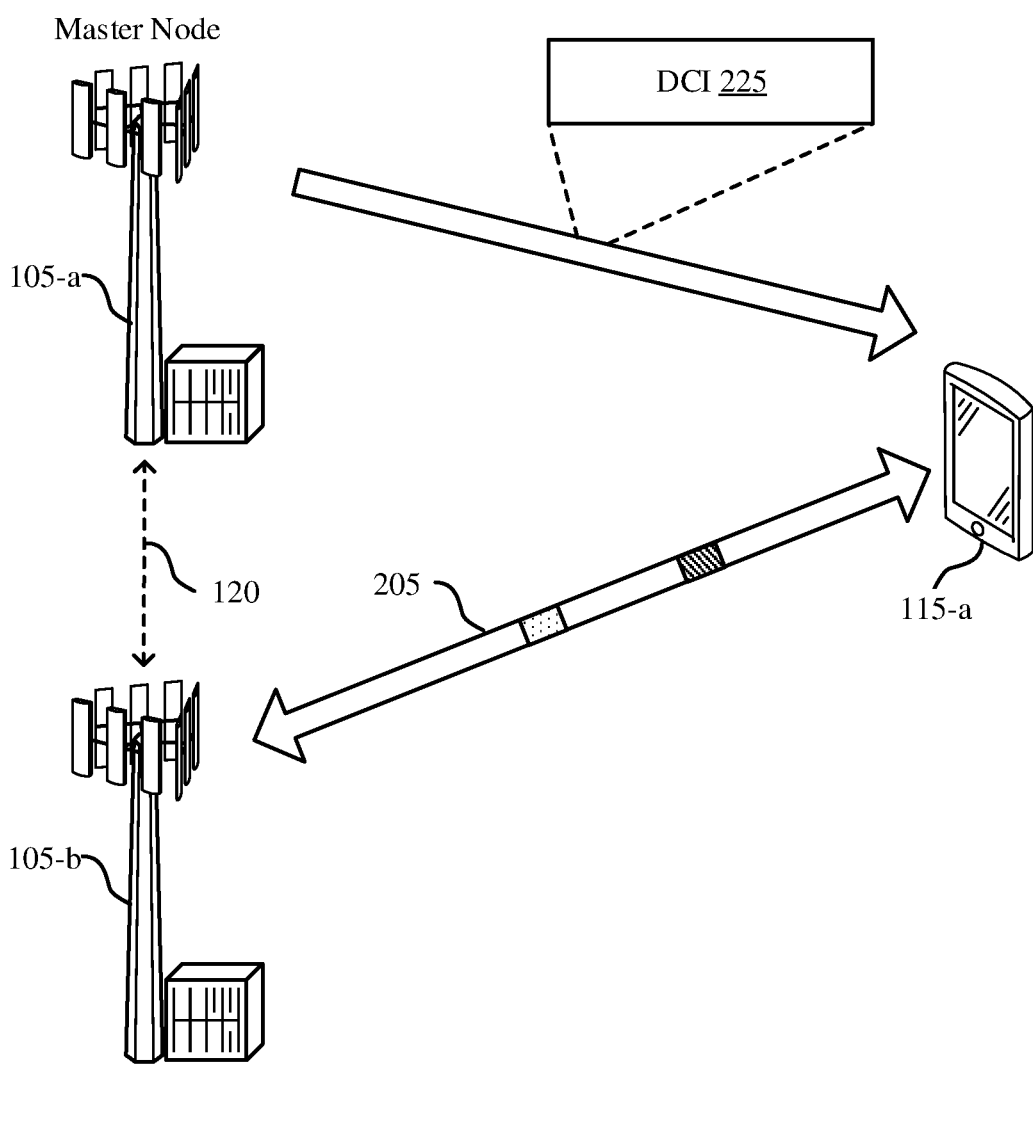
Master Node
DCI 225
105-a
120
205
115-a
105-b
Secondary Node
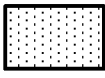 Dormant BWP 210
 Active BWP 215
FIG. 2
200

115-b

430

435

RRC

405

410 — Identify Dormant BWP    Communication Link

415

SCG Activation Req.

DCI/RNTI

420

425    Communication

400

510          515          520

505

500

910                    915                    920

905

900

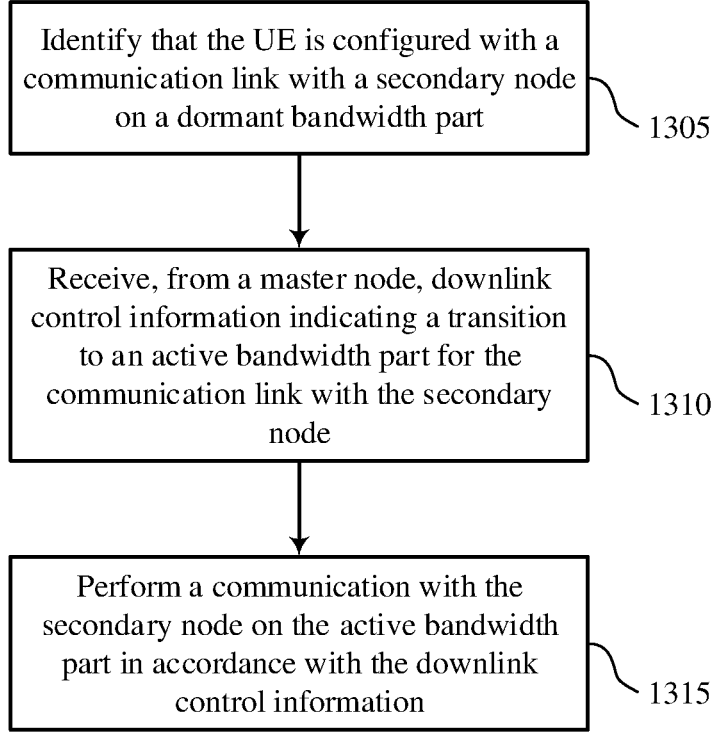

Identify that the UE is configured with a communication link with a secondary node on a dormant bandwidth part
1305

Receive, from a master node, downlink control information indicating a transition to an active bandwidth part for the communication link with the secondary node
1310

Perform a communication with the secondary node on the active bandwidth part in accordance with the downlink control information
1315

Identify that a UE, in communication with the base station operating as a master node, is configured with a communication link with a secondary node on a dormant bandwidth part

1405

Transmit, to the UE, downlink control information indicating a transition to an active bandwidth part for the communication link between the secondary node and the UE

1410

1400

SIGNALING FOR ACTIVATION OF A BANDWIDTH PART

CROSS REFERENCE TO RELATED APPLICATIONS

The present Application is a 371 national stage filing of International PCT Application No. PCT/CN2020/126985 by Cheng et al., entitled "SIGNALING FOR ACTIVATION OF A BANDWIDTH PART," filed Nov. 6, 2020; and claims priority to International Patent Application No. PCT/CN2019/116159 by Cheng et al., entitled "SIGNALING FOR ACTIVATION OF A BANDWIDTH PART," filed Nov. 7, 2019, each of which is assigned to the assignee hereof, and each of which is expressly incorporated by reference in its entirety herein.

FIELD OF TECHNOLOGY

The following relates generally to wireless communications and more specifically to signaling for activation of a bandwidth part.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless multiple access systems may support bandwidth parts (BWP) to support low power UEs with less receiver bandwidth capability than an entire bandwidth. These UEs may be configured with one active downlink BWP and one active uplink BWP for a given serving cell. In some cases, a BWP may be a dormant BWP, in which physical uplink shared channel (PUSCH) or physical downlink shared channel (PDSCH) resources are not allocated and/or used. Thus, a UE may be configured with a communication link with a base station on a dormant BWP. In some cases, a UE may be switched from monitoring a dormant BWP to an active BWP.

SUMMARY

The described techniques relate to improved methods, systems, devices, and apparatuses that support signaling for activation of a bandwidth part. Generally, the described techniques provide signaling formats to cause a user equipment (UE) to switch to an active bandwidth part (BWP) in a secondary cell (SCell) of a secondary cell group (SCG). The techniques include signaling the UE while the UE is in an active state or an inactive state (e.g., sleeping) and while the UE is connected to a secondary node on a dormant BWP. The UE may receive, from a master node, downlink control information (DCI) indicating a transition to an active BWP for the communication link with the secondary node. The UE may then perform a communication with the secondary node on the active bandwidth part in accordance with the DCI. The DCI may include bitmaps with bits corresponding to SCells of an SCG, bitmaps that correspond to radio resource control (RRC) configured SCG, extra bits that signal to the UE that an activation corresponds to a SCG, radio network temporary identifiers (RNTIs) that signal to the UE that the activation corresponds to a SCG, or any combination thereof.

A method of wireless communications is described. The method may include identifying that the UE is configured with a communication link with a secondary node on a dormant bandwidth part, receiving, from a master node, downlink control information indicating a transition to an active bandwidth part for the communication link with the secondary node, and performing a communication with the secondary node on the active bandwidth part in accordance with the downlink control information.

An apparatus for wireless communications is described. The apparatus may include a processor, memory coupled with the processor, and instructions stored in the memory. The instructions may be executable by the processor to cause the apparatus to identify that the UE is configured with a communication link with a secondary node on a dormant bandwidth part, receive, from a master node, downlink control information indicating a transition to an active bandwidth part for the communication link with the secondary node, and perform a communication with the secondary node on the active bandwidth part in accordance with the downlink control information.

Another apparatus for wireless communications is described. The apparatus may include means for identifying that the UE is configured with a communication link with a secondary node on a dormant bandwidth part, receiving, from a master node, downlink control information indicating a transition to an active bandwidth part for the communication link with the secondary node, and performing a communication with the secondary node on the active bandwidth part in accordance with the downlink control information.

A non-transitory computer-readable medium storing code for wireless communications is described. The code may include instructions executable by a processor to identify that the UE is configured with a communication link with a secondary node on a dormant bandwidth part, receive, from a master node, downlink control information indicating a transition to an active bandwidth part for the communication link with the secondary node, and perform a communication with the secondary node on the active bandwidth part in accordance with the downlink control information.

In some examples of the method, apparatuses, and non-transitory computer-readable medium described herein, receiving the downlink control information may include operations, features, means, or instructions for receiving, via the downlink control information, an activation indication signaling activation of a secondary cell group including a set of secondary cells, where the active bandwidth part corresponds to the activated secondary cell group associated with the secondary node.

In some examples of the method, apparatuses, and non-transitory computer-readable medium described herein, the activation indication includes a bit signaling the activation of the secondary cell group.

In some examples of the method, apparatuses, and non-transitory computer-readable medium described herein, receiving the downlink control information may include operations, features, means, or instructions for receiving, via the downlink control information, an activation indication signaling that each secondary cell within a set of secondary cells may be active or inactive, where the active bandwidth part corresponds to an activated secondary cell within the set of secondary cells associated with the secondary node.

In some examples of the method, apparatuses, and non-transitory computer-readable medium described herein, the activation indication includes a bitmap including a bit for each secondary cell within the set of secondary cells.

In some examples of the method, apparatuses, and non-transitory computer-readable medium described herein, the downlink control information further includes a group indication that signals that the activation indication pertains to a secondary cell group including the set of secondary cells.

In some examples of the method, apparatuses, and non-transitory computer-readable medium described herein, the group indication includes a bit indicating activation of the secondary cell group.

Some examples of the method, apparatuses, and non-transitory computer-readable medium described herein may further include operations, features, means, or instructions for receiving a radio resource control signal including a mapping indication of a mapping of a set of secondary cells to a secondary cell group, where the received downlink control information includes the mapping indication to signal activation of the set of secondary cells of the secondary cell group, and where the active bandwidth part corresponds to an activated secondary cell within the secondary cell group associated with the secondary node.

Some examples of the method, apparatuses, and non-transitory computer-readable medium described herein may further include operations, features, means, or instructions for receiving a radio network temporary identifier that indicates that the downlink control information includes an activation indication signaling activation of a set of secondary cells, where the active bandwidth part corresponds to the activated set of secondary cells associated with the secondary node.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication.

In some examples of the method, apparatuses, and non-transitory computer-readable medium described herein, the activation indication signals that each secondary cell within the set of secondary cells may be active or inactive, where the active bandwidth part corresponds to an activated secondary cell within the set of secondary cells associated with the secondary node.

In some examples of the method, apparatuses, and non-transitory computer-readable medium described herein, the activation indication includes a bitmap including a bit for each secondary cell within the set of secondary cells.

Some examples of the method, apparatuses, and non-transitory computer-readable medium described herein may further include operations, features, means, or instructions for receiving a radio resource control signal including a mapping indication of a mapping of the set of secondary cells to a secondary cell group, where receipt of the radio network temporary identifier indicates that the downlink control information includes the activation indication signaling activation of the secondary cell group.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication for the secondary cell group.

In some examples of the method, apparatuses, and non-transitory computer-readable medium described herein, receiving the downlink control information may include operations, features, means, or instructions for receiving the downlink control information while the UE may be in an active state.

In some examples of the method, apparatuses, and non-transitory computer-readable medium described herein, receiving the downlink control information may include operations, features, means, or instructions for receiving, while the UE may be in an inactive state, the downlink control information as a wake up signal, where the UE transitions to an active state upon receipt of the wake up signal.

Some examples of the method, apparatuses, and non-transitory computer-readable medium described herein may further include operations, features, means, or instructions for receiving a radio resource control signal including a mapping indication of a mapping of a set of secondary cells to a secondary cell group, where the received downlink control information includes the mapping indication to signal activation of the set of secondary cells of the secondary cell group, and where the active bandwidth part corresponds to an activated secondary cell within the secondary cell group associated with the secondary node.

Some examples of the method, apparatuses, and non-transitory computer-readable medium described herein may further include operations, features, means, or instructions for receiving a radio network temporary identifier that indicates that the downlink control information includes an activation indication signaling activation of a set of secondary cells, where the active bandwidth part corresponds to the activated set of secondary cells associated with the secondary node.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication for the set of secondary cells including a secondary cell group.

In some examples of the method, apparatuses, and non-transitory computer-readable medium described herein, performing the communication with the secondary node may include operations, features, means, or instructions for monitoring a physical downlink control channel on the activated bandwidth part.

In some examples of the method, apparatuses, and non-transitory computer-readable medium described herein, identifying that the UE may be configured with the communication link with the secondary node on the dormant bandwidth part may include operations, features, means, or instructions for performing one or more cell quality measurements, and transmitting the one or more cell quality measurements to the secondary node.

In some examples of the method, apparatuses, and non-transitory computer-readable medium described herein, receiving the downlink control information may include operations, features, means, or instructions for performing a blind decoding on a physical downlink control channel including the downlink control information, where each blinding decoding attempt contributes to a blind decoding limit configured at the UE.

Some examples of the method, apparatuses, and non-transitory computer-readable medium described herein may further include operations, features, means, or instructions for delaying the communication with the secondary node on the active bandwidth part by a predetermined threshold in response to receiving the indication of the transition.

Some examples of the method, apparatuses, and non-transitory computer-readable medium described herein may further include operations, features, means, or instructions for receiving a radio resource control signaling indicating a discontinuous reception pattern for one or more secondary cells associated with the activated bandwidth part, where the communication may be performed with the secondary node on the active bandwidth part in accordance with the discontinuous reception pattern.

A method of wireless communications at a base station is described. The method may include identifying that a UE, in communication with the base station operating as a master node, is configured with a communication link with a secondary node on a dormant bandwidth part and transmitting, to the UE, downlink control information indicating a transition to an active bandwidth part for the communication link between the secondary node and the UE.

An apparatus for wireless communications at a base station is described. The apparatus may include a processor, memory coupled with the processor, and instructions stored in the memory. The instructions may be executable by the processor to cause the apparatus to identify that a UE, in communication with the base station operating as a master node, is configured with a communication link with a secondary node on a dormant bandwidth part and transmit, to the UE, downlink control information indicating a transition to an active bandwidth part for the communication link between the secondary node and the UE.

Another apparatus for wireless communications at a base station is described. The apparatus may include means for identifying that a UE, in communication with the base station operating as a master node, is configured with a communication link with a secondary node on a dormant bandwidth part and transmitting, to the UE, downlink control information indicating a transition to an active bandwidth part for the communication link between the secondary node and the UE.

A non-transitory computer-readable medium storing code for wireless communications at a base station is described. The code may include instructions executable by a processor to identify that a UE, in communication with the base station operating as a master node, is configured with a communication link with a secondary node on a dormant bandwidth part and transmit, to the UE, downlink control information indicating a transition to an active bandwidth part for the communication link between the secondary node and the UE.

In some examples of the method, apparatuses, and non-transitory computer-readable medium described herein, transmitting the downlink control information may include operations, features, means, or instructions for transmitting, via the downlink control information, an activation indication signaling activation of a secondary cell group including a set of secondary cells, where the active bandwidth part corresponds to the activated secondary cell group associated with the secondary node.

In some examples of the method, apparatuses, and non-transitory computer-readable medium described herein, the activation indication includes a bit signaling the activation of the secondary cell group.

In some examples of the method, apparatuses, and non-transitory computer-readable medium described herein, transmitting the downlink control information may include operations, features, means, or instructions for transmitting, via the downlink control information, an activation indication signaling that each secondary cell within a set of secondary cells may be active or inactive, where the active bandwidth part corresponds to an activated secondary cell within the set of secondary cells associated with the secondary node.

In some examples of the method, apparatuses, and non-transitory computer-readable medium described herein, the activation indication includes a bitmap including a bit for each secondary cell within the set of secondary cells.

In some examples of the method, apparatuses, and non-transitory computer-readable medium described herein, the downlink control information further includes a group indication that signals that the activation indication pertains to a secondary cell group including the set of secondary cells.

In some examples of the method, apparatuses, and non-transitory computer-readable medium described herein, the group indication includes a bit signaling activation of the set of secondary cells including a secondary cell group.

Some examples of the method, apparatuses, and non-transitory computer-readable medium described herein may further include operations, features, means, or instructions for transmitting a radio resource control signal including a mapping indication of a mapping of a set of secondary cells to a secondary cell group, where the transmitted downlink control information includes the mapping indication to signal activation of the set of secondary cells of the secondary cell group, and where the active bandwidth part corresponds to an activated secondary cell within the secondary cell group associated with the secondary node.

Some examples of the method, apparatuses, and non-transitory computer-readable medium described herein may further include operations, features, means, or instructions for transmitting a radio network temporary identifier that indicates that the downlink control information includes an activation indication signaling activation of a set of secondary cells, where the active bandwidth part corresponds to the activated set of secondary cells associated with the secondary node.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication.

In some examples of the method, apparatuses, and non-transitory computer-readable medium described herein, the activation indication signals that each secondary cell within the set of secondary cells may be active or inactive, where the active bandwidth part corresponds to an activated secondary cell within the set of secondary cells associated with the secondary node.

In some examples of the method, apparatuses, and non-transitory computer-readable medium described herein, the activation indication includes a bitmap including a bit for each secondary cell within the set of secondary cells.

Some examples of the method, apparatuses, and non-transitory computer-readable medium described herein may further include operations, features, means, or instructions for transmitting a radio resource control signal including a mapping indication of a mapping of the set of secondary cells to a secondary cell group, where transmission of the radio network temporary identifier indicates that the downlink control information includes the activation indication signaling activation of the secondary cell group.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication for the secondary cell group.

In some examples of the method, apparatuses, and non-transitory computer-readable medium described herein, transmitting the downlink control information may include operations, features, means, or instructions for transmitting the downlink control information while the UE may be in an active state.

In some examples of the method, apparatuses, and non-transitory computer-readable medium described herein, transmitting the downlink control information may include operations, features, means, or instructions for transmitting, while the UE may be in an inactive state, the downlink control information as a wake up signal.

Some examples of the method, apparatuses, and non-transitory computer-readable medium described herein may further include operations, features, means, or instructions for transmitting a radio resource control signal including a mapping indication of a mapping of a set of secondary cells to a secondary cell group, where the transmitted downlink control information includes the mapping indication to signal activation of the set of secondary cells of the secondary cell group, and where the active bandwidth part corresponds to an activated secondary cell within the secondary cell group associated with the secondary node.

Some examples of the method, apparatuses, and non-transitory computer-readable medium described herein may further include operations, features, means, or instructions for transmitting a radio network temporary identifier that indicates that the downlink control information includes an activation indication signaling activation of a set of secondary cells, where the active bandwidth part corresponds to the activated set of secondary cells associated with the secondary node.

In some examples of the method, apparatuses, and non-transitory computer-readable medium described herein, the radio network temporary identifier scrambles the downlink control information including the activation indication.

In some examples of the method, apparatuses, and non-transitory computer-readable medium described herein, the radio network temporary identifier includes a bit signaling that the downlink control information includes the activation indication for the set of secondary cells including a secondary cell group.

Some examples of the method, apparatuses, and non-transitory computer-readable medium described herein may further include operations, features, means, or instructions for transmitting a radio resource control signaling indicating a discontinuous reception pattern for one or more secondary cells associated with the activated bandwidth part.

BRIEF DESCRIPTION OF THE DRAWINGS

FIG. 2 illustrates an example of a wireless communications system that supports signaling for activation of a bandwidth part in accordance with aspects of the present disclosure.

FIGS. 13 and 14 show flowcharts illustrating methods that support signaling for activation of a bandwidth part in accordance with aspects of the present disclosure.

DETAILED DESCRIPTION

Some wireless multiple access systems may support bandwidth parts (BWPs) to support low power user equipment (UEs) with less receiver bandwidth capability than an entire bandwidth. These UEs may be configured with one active downlink BWP and one active uplink BWP for a given serving cell. In some cases, a BWP may be a dormant BWP, in which physical uplink shared channel (PUSCH) or physical downlink shared channel (PDSCH) resources are not allocated and/or used. Thus, a UE may be configured with a communication link with a base station on a dormant BWP.

In some cases, a UE may be switched from monitoring a dormant BWP to an active BWP in a given serving cell.

Techniques described herein may be used to switch, by master node, a UE from a dormant BWP to an active BWP on a communication link with a secondary node. In some cases, the master node may transmit downlink control information (DCI) with an activation indication to indicate a transition to an active bandwidth part for the communication link with the secondary node. The UE may perform a communication with the secondary node on the active bandwidth part in accordance with the DCI. When the UE receives the DCI, the UE may be in an active state or an inactive state. The DCI may activate one or more individual secondary cells (SCells), a secondary cell group (SCG), or both. Accordingly, the UE may switch to a BWP corresponding to the activated SCell or secondary cell group (SCG) in response to receiving the DCI.

Particular aspects of the subject matter described herein may be implemented to realize one or more advantages. The described techniques may support improvements in the activation of BWPs, decreasing signaling overhead, and improving reliability, among other advantages. As such, supported techniques may include improved network operations and, in some examples, may promote network efficiencies, among other benefits. Aspects of the disclosure are initially described in the context of wireless communications systems. Aspects of the disclosure are further described with respect to a wireless communications systems illustrating activation of a BWP and a state diagram illustrating state transitions for a UE. Aspects of the disclosure are further illustrated by and described with reference to apparatus diagrams, system diagrams, and flowcharts that relate to signaling for activation of a bandwidth part.

Figure 1:
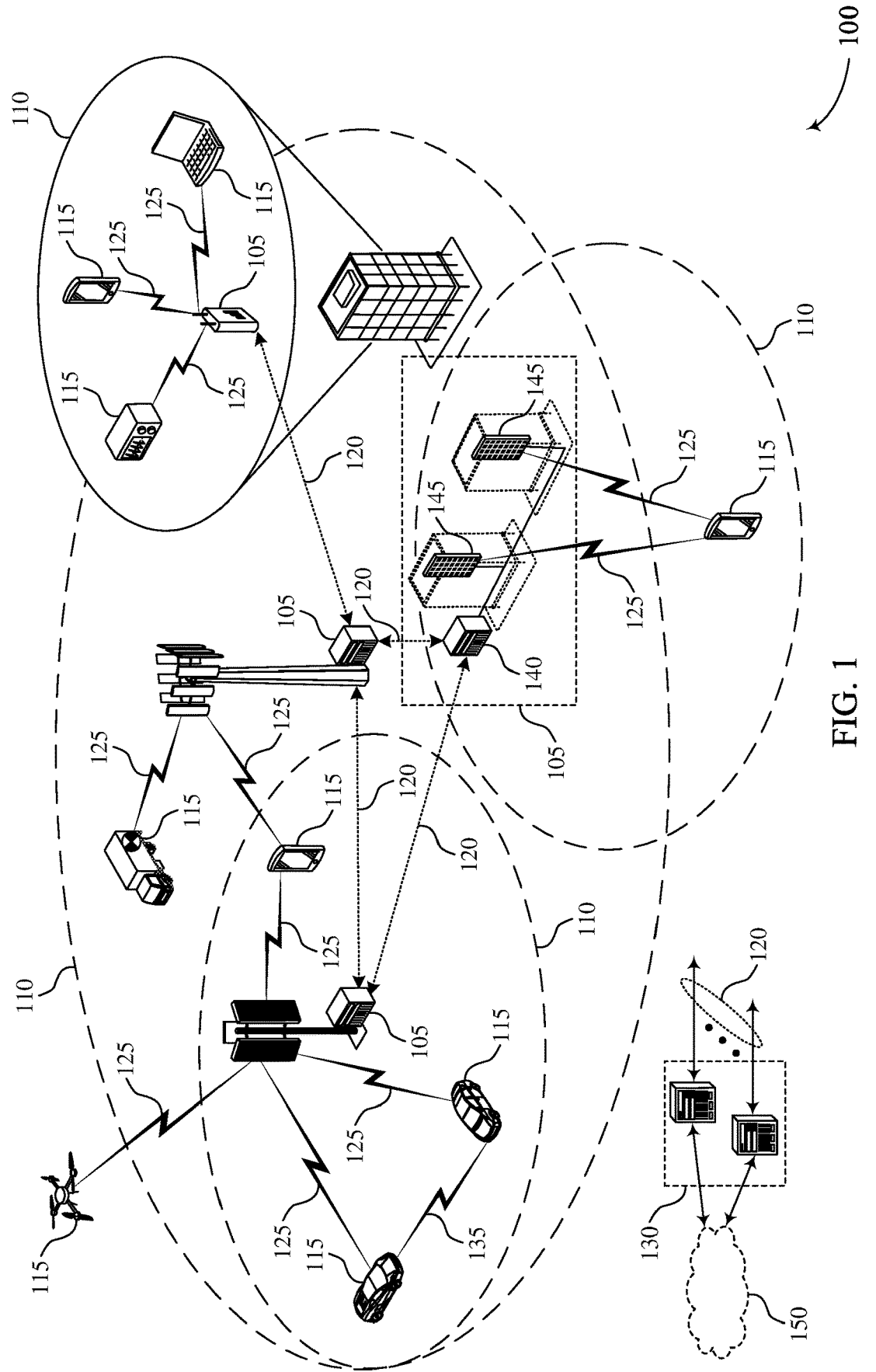
FIG. 1 illustrates an example of a system for wireless communications that supports signaling for activation of a bandwidth part in accordance with aspects of the present disclosure.

FIG. 1 illustrates an example of a wireless communications system 100 that supports signaling for activation of a bandwidth part in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/$ $(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some UEs 115 in the wireless communications system 100 may be lower power UEs 115 that may not be able to monitor or communicate a full radiofrequency spectrum bandwidth. As such, these UEs 115 (as well as some other UEs, such as full power UEs 115) may be configured with BWPs, which may be a portion of a full bandwidth. As such, these UEs may perform uplink communications on an uplink BWP and downlink communications on a downlink BWP. A UE 115 may be configured with one active downlink BWP and one active uplink BWP at a given time for a serving cell. In some cases, a base station 105 may transmit an RRC signal or DCI signal to switch the UE 115 to different BWPs in a serving cell. UEs 115 may also switch to a default BWP in a serving cell based on expiration of a timer or based on some other condition.

Some BWPs may be configured as dormant BWPs. A UE 115 may not perform physical downlink control channel (PDCCH) monitoring on a dormant BWP but may perform periodic cell quality information (CQI) measurements and report these measurements to a base station 105. A UE 115 may also perform radio resource management (RRM), AAC, and beam management measurements and reporting on a dormant BWP. In some cases, the UEs 115 may be connected to the secondary nodes on the dormant BWPs due to expiration of an inactivity timer on an active BWP. Fast cell activation for a UE 115 connected to a base station 105 via a dormant BWP may be achieved by transitioning between dormancy behavior and normal data transfer on activated SCells.

According to certain implementations, a UE 115 may be connected to a secondary node (e.g., a base station 105) on a dormant BWP. To switch the UE 115 to an active BWP on an SCell or SCell group, a master node (e.g., a base station 105) may transmit DCI, which indicates to the UE 115 to transition to an active BWP for the communication link with the secondary node. In accordance with the DCI, the UE 115 may perform a communication with the secondary node on the active BWP. Thus, the master node may manage the activation of BWPs for UEs 115 connected to secondary nodes via dormant BWPs.

The DCI may be configured with an activation indication that indicates activation of individual SCells within an SCG or activation of the SCG. Accordingly, the UE 115 may communicate with the secondary node via an active BWP corresponding to the activated SCell or SCell group. In some cases, the activation indication includes a bitmap, with each bit signaling whether individual SCells are active or inactive. The DCI may also include an extra bit that signals whether an SCG including a set of SCells is active or inactive. In other examples, the DCI may include a bitmap corresponding to a SCG mapping that is preconfigured via RRC signaling. In some examples, the UE 115 may also receive an RNTI that signals that the DCI includes the activation indication for the set of SCells (e.g., individual SCells, an SCell group, or both). When the UE 115 is in an inactive state (e.g., sleeping), then the DCI may be received as a wake-up signal, and the UE 115 may transition to an active state. The DCI transmitted as the wake-up signal may include the SCell bitmap, extra bit, SCell group bitmap, radio network temporary identifier (RNTI), etc., as described with respect to the UE 115 in an active state.

FIG. 2 illustrates an example of a wireless communications system 200 that supports signaling for activation of a bandwidth part in accordance with aspects of the present disclosure. In some examples, wireless communications system 200 may implement aspects of wireless communication system 100. The wireless communications system 200 includes a base station 105-*a*, a base station 105-*b*, and a UE 115-*a*. The base stations 105-*a* and 105-*b* may be examples of the base stations 105 as described with respect to FIG. 1, and the UE 115-*a* may be an example of the UEs 115 described with respect to FIG. 1.

The base station 105-*a* may be an example of a master node, and the base station 105-*b* may be an example of a secondary node. As such, the base station 105-*a* may manage resources, cell activation, etc. on the base station 105-*b* and other base stations via a backhaul link 120, for example. In some cases, a single base station (e.g., base station 105-*a*) may support a master node (MN) that is associated with a master cell group and one or more secondary nodes (SN) that are associated with an SGG. The master node and the secondary nodes may be physically or logically separate components of the base station 105. The UE 115-*a* may establish a communication link 205 via an SCell of the base station 105-*b* (e.g., the secondary node). The UE 115-*a* may perform uplink and/or downlink communications on a respective active UL BWP and active DL BWP associated with the SCell. In some cases, the UE 115-*a* may switch to a dormant BWP 210 based on an instruction received from the base station 105-*a* (e.g., the master node). For example, the master node may utilize DCI 225 to indicate to the UE 115-*a* to suspend a SCG/secondary node for some period.

While the UE 115-*a* is connected to the secondary node (e.g., the base station 105-*b*) via the dormant bandwidth part (e.g., the SCG and the PSCell are put in dormancy by the UE 115-*a*), the UE may store the SCG configuration but may not monitor a PDCCH of the PSCell/SCell for power saving purposes. While in SCG suspension, the UE 115-*a* may be configured to perform RRM and channel state information (CSI) measurements for the SCG, and report the measurement results of the SCG to the master node (e.g., the base station 105-*a*).

The techniques described herein may be used such that the master node (e.g., the base station 105-*a*) may activate a bandwidth part at the UE 115-*a* in an efficient manner. Activation of a bandwidth part at UE 115-*a* may correspond to transmitting an indication of an SCell and/or SCG that is active, such that the UE 115-*a* may transition to an active BWP 215 corresponding to the indicated SCell and/or SCell group and communicate with the secondary node via the active BWP 215. To indicate the active BWP 215 to the base station, the master node may utilize DCI 225 (e.g., PDCCH DCI) that indicates the transition to the active BWP 215 for the communication with the secondary node.

The DCI 225 may include various signaling formats to indicate the activated SCell and/or SCG. In some cases, the DCI 225 may be used in conjunction with other signaling (e.g., RNTI, RRC) to indicate activation of the SCell/SCG. For example, the DCI 225 may include a SCell bitmap (e.g., an N bit bitmap), where each bit corresponds to an SCell of a set of SCells (e.g., an SCG). In some cases, N is the maximum number of SCells supported in a master cell group (MCG) (e.g., 15 SCells supported in the MCG). Accordingly, when a bit has the value of "1," then the corresponding SCell may be activated for the UE 115-*a*, and when a bit has the value of "0," then the corresponding SCell may be indicated as inactive for the UE 115-*a*. In addition to the bitmap, the DCI 225 may include a bit (e.g., a 16th bit) to indicate whether the DCI 225 is used to indicate dormancy (or activation) of an SCG. Thus, when the bit value is 1, then each SCell and the PSCell of the SCG may be activated for the UE 115-*a*, and if the bit value is 0, then each SCell of the SCG may be indicated as inactive for the UE 115-*a*. In some examples, the 16th bit may indicate that the bitmap corresponds to indication of dormancy or activation of the SCells in a SCG. Further, additional bits may be used to indicate the dormancy status of cell of the SCG without using the 16th bit for activation of the SCG.

In other cases, the UE 115-*a* may be configured with a mapping of SCGs via RRC. All serving cells (e.g., PSCell and SCells) in an SCG may be mapped to a particular bit via the RRC. For example, the RRC may indicate bitmap, where each bit of the bitmap corresponds to a SCG, which may have one or more SCells. Accordingly, the DCI 225 may include an indication of the SCG group mapping, where a bit value of 1 indicates activation of the corresponding SCG for the UE 115-*a* and the bit value of 0 indicates that the corresponding SCG is inactive for the UE 115-*a*. In some cases, an SCG may not contain both an MCG cell and a SCG cell.

Some examples may also utilize RNTI separate from an MCG SCell indication to signal that the DCI 225 includes the activation of an SCell or SCG. In some cases, a new RNTI may be used to scramble the DCI 225 for a SCG. In other cases, the RNTI used for the MCG SCell indication may be used, but an additional bit may be used to differentiate the MCG indication from the SCell/SCG activation. Further, the bitmap (e.g., the N bit bitmap), where each bit corresponds to an SCell, may be used in addition to the RNTI such that the RNTI indicates that the DCI 225 includes an activation of an SCell. Further, the RNTI may also be used in conjunction with the SCG bitmap (configured via RRC). In such cases, a new RNTI may be used to scramble the DCI 225 or the RNTI for the MCG SCell indication may be used, by the RNTI may include an extra bit to differentiate the MCG SCell indication from the SCell activation.

In some examples, the UE 115-*a* may be in an inactive state (e.g., sleeping). Accordingly, the DCI 225 may be transmitted as a wake-up signal. When the UE 115-*a* receives the wake-up signal, the UE 115-*a* may transition to the active state, process the DCI 225 (which may include the information to activate an SCell/SCG, as described herein), and transition to an active BWP based on the DCI 225. That is, the SCG group bitmap (e.g., configured via RRC) may be signaled for a wake-up signal PDCCH. Further, a separate RNTI may be used for the wake-up signal PDCCH, and the RNTI may be used to scramble the PDCCH DCI 225 or the RNTI used for MCG SCell indications may be used in addition to an extra bit that is used to differentiate the SCell activation from the MCG SCell indications. Thus, a UE may "wake-up" and transition to an active BWP in accordance with the DCI 225 SCell/SCG activation.

When the UE 115-*a* receives these indications, the UE 115-*a* may switch from a dormancy behavior (e.g., not monitoring a PDCCH) to a non-dormancy behavior in a PSCell and activated SCells of the SCG (e.g., the UE 115 switches from the dormant BWP 210 to the active BWP 215). Further, blind-decoding/control channel element for PDCCH decoding on the PCell for the activation indications may be counted for the MCG blind decoding/control channel element limits of the UE 115-*a*. That is, when the UE 115-*a* performs blind decoding for the DCI 225, then each attempt may count towards a limit configured at the UE 115-*a*. Additionally, the MCG indications and SCG indications may be asynchronous, and an application delay for the BWP switch may be increased to accommodate the asynchronization time. The UE 115-*a* may use additional time to switch to the active BWP 215 to start communicating on the active BWP. Moreover, the MCG and SCG may follow different discontinuous reception (DRX) patterns. As such, RRC signaling may be used to indicate DRX patterns for SCells/SCGs, and the patterns may be used when the UE 115-*a* switches to the active BWP 215 corresponding to the cell.

Figure 3:
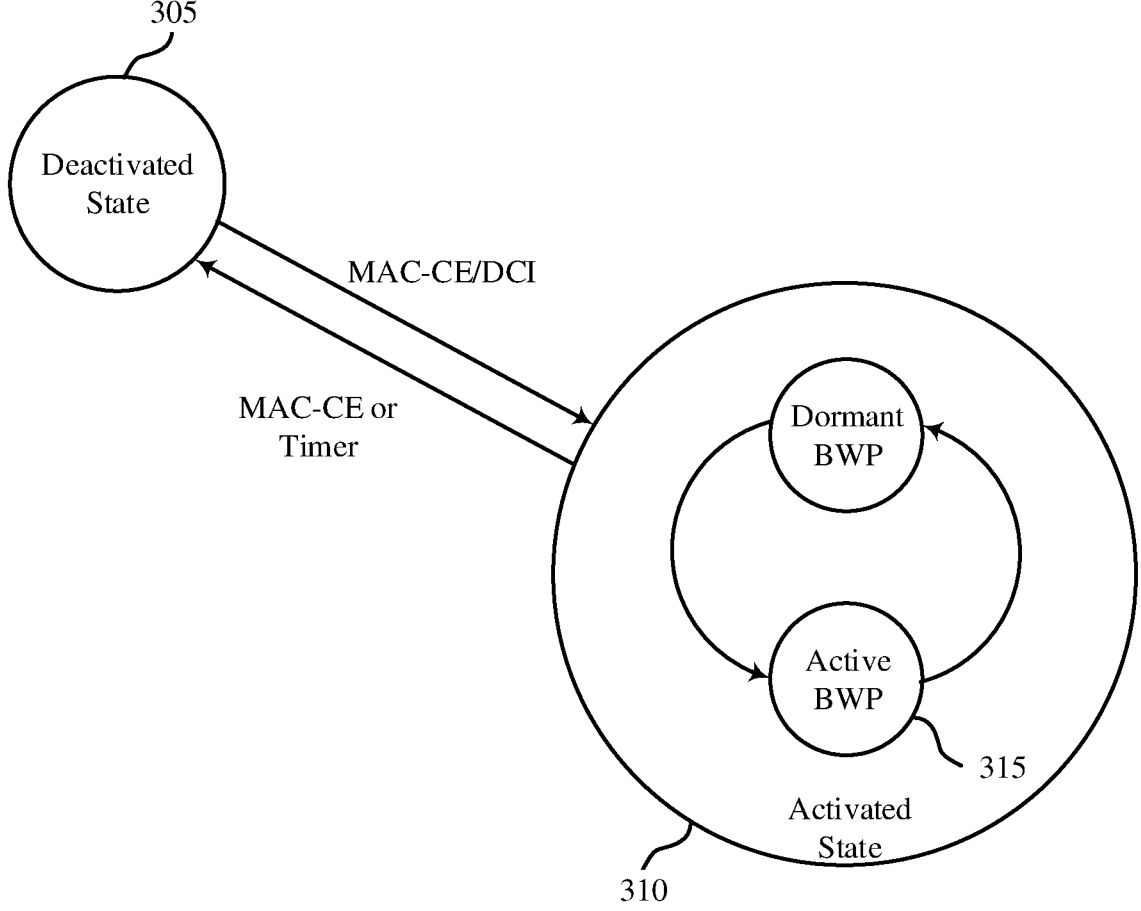
FIG. 3 illustrates an example of a state diagram that supports signaling for activation of a bandwidth part in accordance with aspects of the present disclosure.

FIG. 3 illustrates an example of a state diagram 300 that supports signaling for activation of a bandwidth part in accordance with aspects of the present disclosure. In some examples, state diagram 300 may implement aspects of wireless communication system 100. The state diagram 300 may indicate various states and state transmissions of a UE (e.g., the UE 115-*a*) of FIG. 3.

When the UE 115 is in deactivated state 305 (e.g., sleeping or inactive), the UE 115 may be switched to an activated state 310 via MAC-CE signaling or via wake-up signal DCI, as described herein. Further, the UE 115 may switch from the activated state 310 via MAC-CE signaling and/or based on expiration of a timer (e.g., sCellDeactivationTimer). While the UE 115 is in the activated state 310, the UE may be connected with a secondary node on an active BWP (state 315) or a dormant BWP (state 320). The active or inactive BWP may be an UL BWP or a DL BWP. While being connected to a node on the dormant BWP (at state 320), the UE 115 may not monitor a PDCCH but may perform CSI, RRM ACG, and beam management measurements and reporting.

The UE 115 may transition to an active BWP (state 315) from the dormant BWP (state 320) using fast cell activation, as described herein, such that the UE 115 may perform data transfer on the activated SCells (e.g., the activated BWP). The UE 115 may transition based on a DCI (e.g., for cross-carrier BWP switch) or an implicit BWP switch. The UE 115 may transition from the active BWP (state 315) to the dormant BWP (state 320) based on DCI or expiration of a timer (e.g., a bwp-inactivityTimer). As discussed herein, the DCI may include an SCell bitmap, an SCell bitmap with an extra bit, an SCG bitmap (configured via RRC), an RNTI, an RNTI with an extra bit, a combination of the SCell bitmap and RNTI, a combination of the SCG group bitmap and RNTI, etc. as described herein to indicate the SCell/SCG for BWP activation.

Figure 4:
FIG. 4 illustrates an example of a process flow diagram that supports signaling for activation of a bandwidth part in accordance with aspects of the present disclosure.

FIG. 4 illustrates an example of a process flow diagram 400 that supports signaling for activation of a bandwidth part in accordance with aspects of the present disclosure. In some examples, process flow diagram 400 may implement aspects of wireless communication system 100. Process flow diagram 400 includes a UE 115-*b*, which may be examples of the corresponding devices as discussed with respect to FIGS. 1 through 3 (e.g., UE 115-*a* of FIG. 2). Process flow diagram 400 includes a master node 430 and a secondary node 435, which may be examples of a base station 105 as discussed with respect to FIGS. 1 and 2. The secondary node 435 may correspond to or support a SCG.

At 405, the UE 115-*b* may receive an RRC signal from the master node 430. The RRC signal may configure various SCG mappings at the UE 115-*b*.

At 410, the UE 115-*b* may identify that the UE 115-*b* is configured with a communication link with the secondary node 435 on a dormant BWP. The UE 115-*b* may be connected to the secondary node 435 based on expiration of a timer, based on DCI signaling, etc.

At 415, the master node 430 may transmit an SCG activation request to the secondary node 435, such that the secondary node 435 may activate the SCells of the SCG.

At 420, the UE 115-*b* may receive, from the master node 430, DCI indicating a transition to an active BWP for the communication link with the secondary node. In some examples, the UE 115-*b* may receive an RNTI that may be used to identify that the DCI includes an activation of an SCell/SCG. The DCI may include signaling formats such as, an SCell bitmap, an SCell bitmap with an extra bit, an SCG bitmap (configured via RRC), an RNTI, an RNTI with an extra bit, a combination of the SCell bitmap and RNTI, a combination of the SCG group bitmap and RNTI, etc. as described herein. In some cases, the UE 115 is in a deactivated/inactive state when it receives the DCI as a wake-up signal. The DCI may transition to the active state and switch to the active BWP in accordance with the DCI indication.

At 425, the UE 115-*b* performs a communication with the secondary node on the active BWP in accordance with the DCI. The communication may include monitoring PDCCH, performing uplink or downlink communications, etc.

Figure 5:
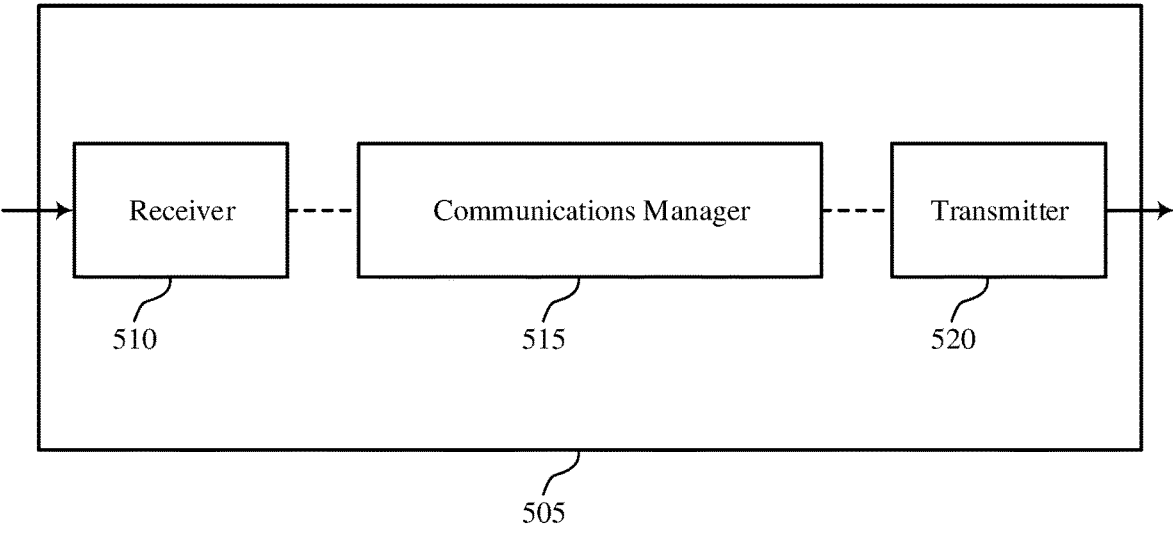
FIGS. 5 and 6 show block diagrams of devices that support signaling for activation of a bandwidth part in accordance with aspects of the present disclosure.

FIG. 5 shows a block diagram 500 of a device 505 that supports signaling for activation of a bandwidth part in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to signaling for activation of a bandwidth part, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that the UE is configured with a communication link with a secondary node on a dormant bandwidth part, receive, from a master node, downlink control information indicating a transition to an active bandwidth part for the communication link with the secondary node, and perform a communication with the secondary node on the active bandwidth part in accordance with the downlink control information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to more efficiently transition to an active BWP to begin communications, and more specifically to receive DCI that indicates activation of the BWP and transition to the active BWP. For example, the device 505 may identify an SCell or SCG corresponding to the activated BWP and perform communication on the activated BWP in accordance with the identification of the SCell or SCG.

Based on implementing the feedback mechanism techniques as described herein, a processor of a UE 115 (e.g., controlling the receiver 510, the transmitter 520, or the transceiver 820 as described with reference to FIG. 8) may increase reliability and decrease signaling overhead in transitioning to the active BWP.

Figure 6:
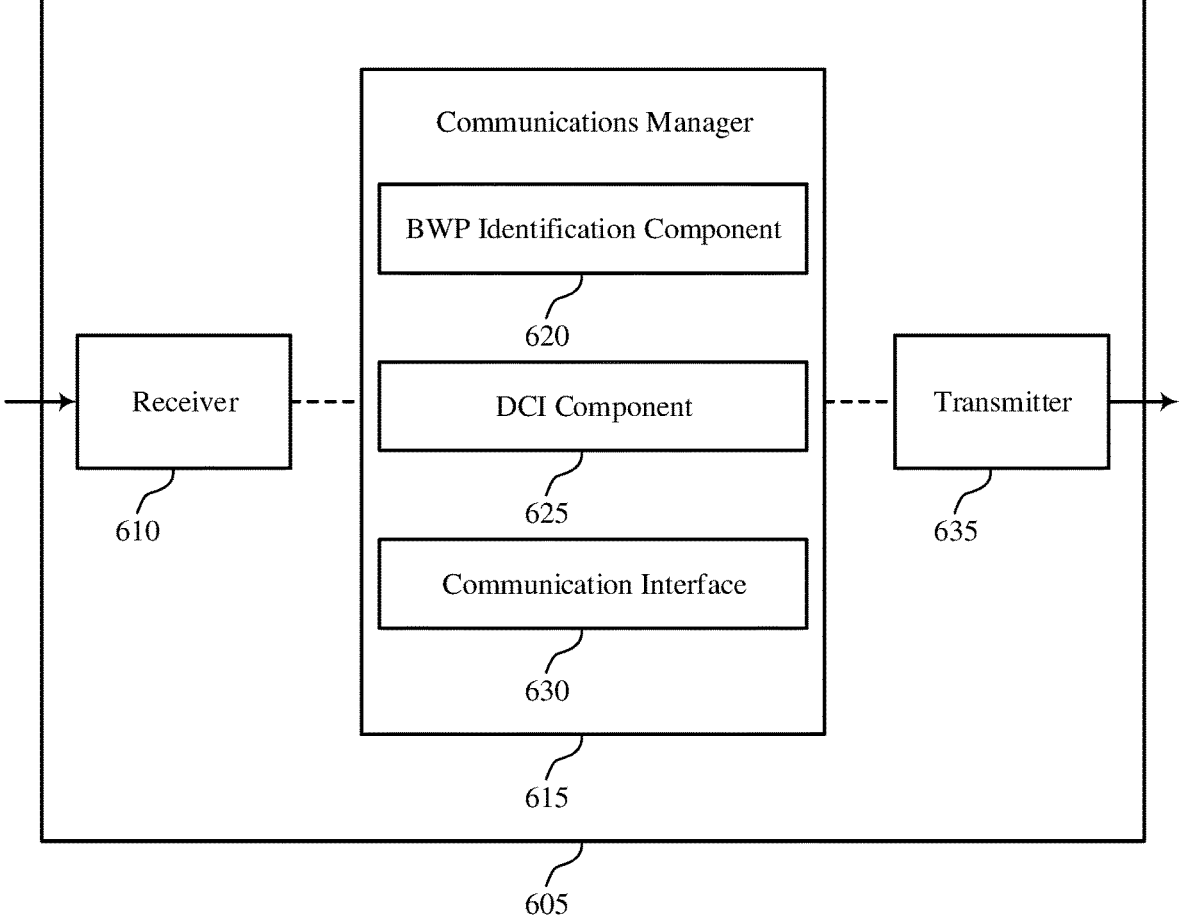

FIG. 6 shows a block diagram 600 of a device 605 that supports signaling for activation of a bandwidth part in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to signaling for activation of a bandwidth part, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a BWP identification component 620, a DCI component 625, and a communication interface 630. The communications manager 615 may be an example of aspects of the communications manager 810 described herein. The BWP identification component 620 may identify that the UE is configured with a communication link with a secondary node on a dormant bandwidth part.

The DCI component 625 may receive, from a master node, downlink control information indicating a transition to an active bandwidth part for the communication link with the secondary node. The communication interface 630 may perform a communication with the secondary node on the active bandwidth part in accordance with the downlink control information.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
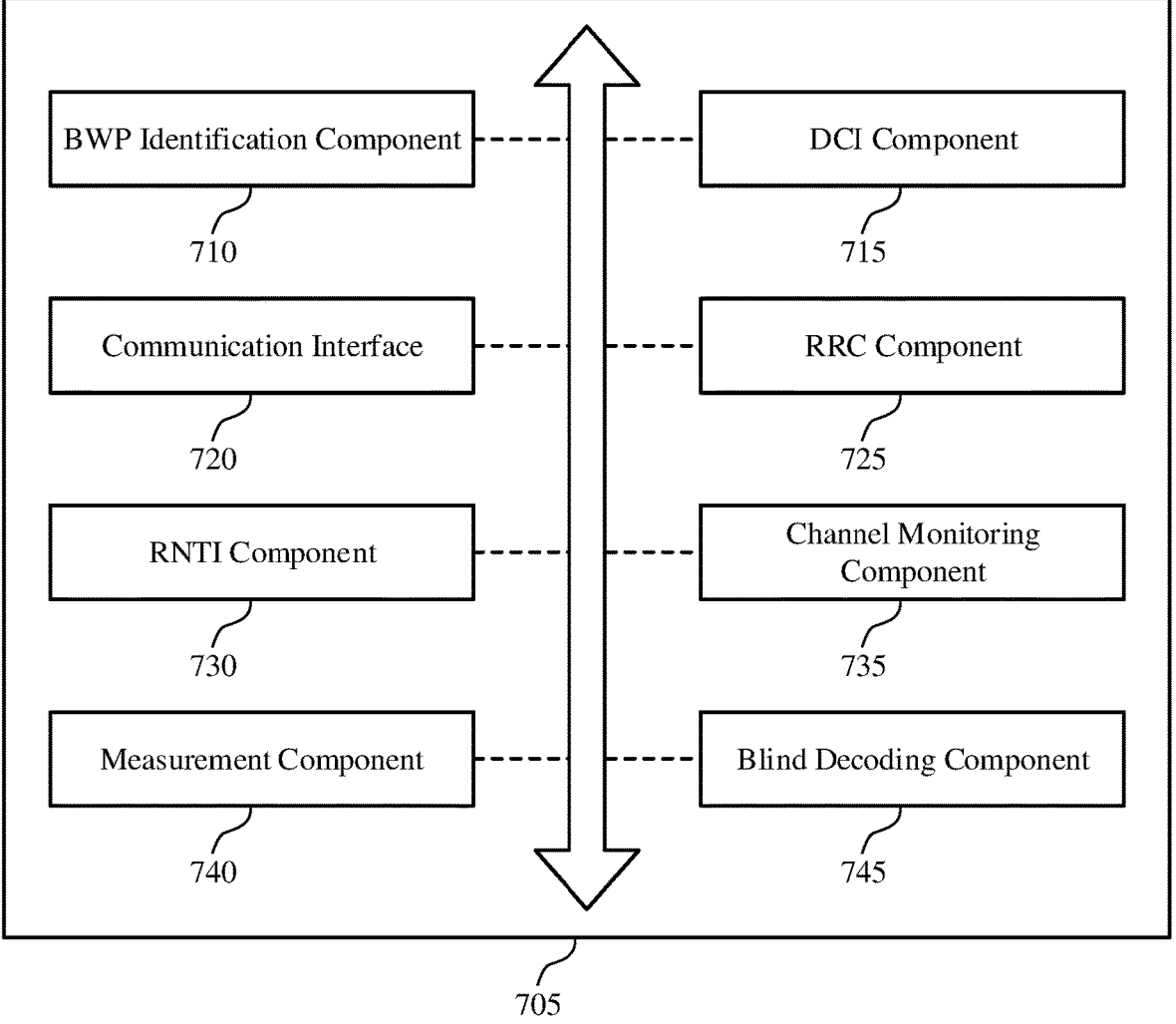
FIG. 7 shows a block diagram of a communications manager that supports signaling for activation of a bandwidth part in accordance with aspects of the present disclosure.

FIG. 7 shows a block diagram 700 of a communications manager 705 that supports signaling for activation of a bandwidth part in accordance with aspects of the present disclosure. The communications manager 705 may be an example of aspects of a communications manager 515, a communications manager 615, or a communications manager 810 described herein. The communications manager 705 may include a BWP identification component 710, a DCI component 715, a communication interface 720, a RRC component 725, a RNTI component 730, a channel monitoring component 735, a measurement component 740, and a blind decoding component 745. Each of these modules may communicate, directly or indirectly, with one another (e.g., via one or more buses).

The BWP identification component 710 may identify that the UE is configured with a communication link with a secondary node on a dormant bandwidth part. The DCI component 715 may receive, from a master node, downlink control information indicating a transition to an active bandwidth part for the communication link with the secondary node.

In some examples, the DCI component 715 may receive, via the downlink control information, an activation indication signaling activation of a secondary cell group including a set of secondary cells, where the active bandwidth part corresponds to the activated secondary cell group associated with the secondary node.

In some examples, the DCI component 715 may receive, via the downlink control information, an activation indication signaling that each secondary cell within a set of secondary cells is active or inactive, where the active bandwidth part corresponds to an activated secondary cell within the set of secondary cells associated with the secondary node.

In some examples, the DCI component 715 may receive the downlink control information while the UE is in an active state. In some examples, the DCI component 715 may receive, while the UE is in an inactive state, the downlink control information as a wake up signal, where the UE transitions to an active state upon receipt of the wake up signal.

In some cases, the activation indication includes a bit signaling the activation of the secondary cell group. In some cases, the activation indication includes a bitmap including a bit for each secondary cell within the set of secondary cells.

In some cases, the downlink control information further includes a group indication that signals that the activation indication pertains to a secondary cell group including the set of secondary cells. In some cases, the group indication includes a bit indicating activation of the secondary cell group.

The communication interface 720 may perform a communication with the secondary node on the active bandwidth part in accordance with the downlink control information. In some examples, the communication interface 720 may delay the communication with the secondary node on the active bandwidth part by a predetermined threshold in response to receiving the indication of the transition.

The RRC component 725 may receive a radio resource control signal including a mapping indication of a mapping of a set of secondary cells to a secondary cell group, where the received downlink control information includes the mapping indication to signal activation of the set of secondary cells of the secondary cell group, and where the active bandwidth part corresponds to an activated secondary cell within the secondary cell group associated with the secondary node.

In some examples, the RRC component 725 may receive a radio resource control signal including a mapping indication of a mapping of the set of secondary cells to a secondary cell group, where receipt of the radio network temporary identifier indicates that the downlink control information includes the activation indication signaling activation of the secondary cell group.

In some examples, the RRC component 725 may receive a radio resource control signaling indicating a discontinuous reception pattern for one or more secondary cells associated with the activated bandwidth part, where the communication is performed with the secondary node on the active bandwidth part in accordance with the discontinuous reception pattern.

In some cases, the radio network temporary identifier scrambles the downlink control information including the activation indication. In some cases, the radio network temporary identifier includes a bit signaling that the downlink control information includes the activation indication for the secondary cell group.

The RNTI component 730 may receive a radio network temporary identifier that indicates that the downlink control information includes an activation indication signaling activation of a set of secondary cells, where the active bandwidth part corresponds to the activated set of secondary cells associated with the secondary node.

In some cases, the radio network temporary identifier scrambles the downlink control information including the activation indication. In some cases, the radio network temporary identifier includes a bit signaling that the downlink control information includes the activation indication.

In some cases, the activation indication signals that each secondary cell within the set of secondary cells is active or inactive, where the active bandwidth part corresponds to an activated secondary cell within the set of secondary cells associated with the secondary node. In some cases, the activation indication includes a bitmap including a bit for each secondary cell within the set of secondary cells.

In some cases, the radio network temporary identifier includes a bit signaling that the downlink control information includes the activation indication for the set of secondary cells including a secondary cell group. The channel monitoring component 735 may monitor a physical downlink control channel on the activated bandwidth part.

The measurement component 740 may perform one or more cell quality measurements. In some examples, the measurement component 740 may transmit the one or more cell quality measurements to the secondary node.

The blind decoding component 745 may perform a blind decoding on a physical downlink control channel including the downlink control information, where each blinding decoding attempt contributes to a blind decoding limit configured at the UE.

Figure 8:
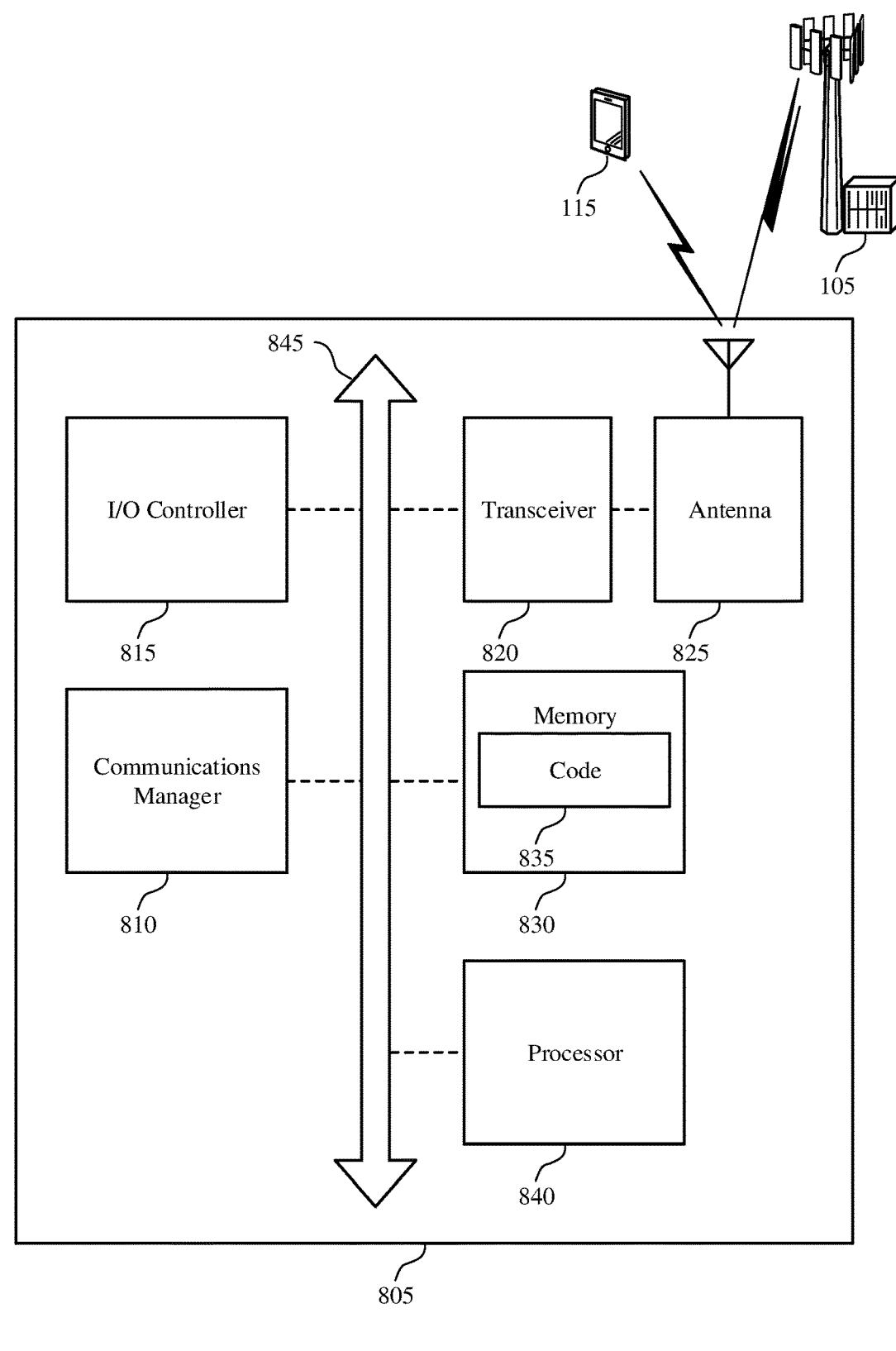
FIG. 8 shows a diagram of a system including a device that supports signaling for activation of a bandwidth part in accordance with aspects of the present disclosure.

FIG. 8 shows a diagram of a system 800 including a device 805 that supports signaling for activation of a bandwidth part in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that the UE is configured with a communication link with a secondary node on a dormant bandwidth part, receive, from a master node, downlink control information indicating a transition to an active bandwidth part for the communication link with the secondary node, and perform a communication with the secondary node on the active bandwidth part in accordance with the downlink control information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling for activation of a bandwidth part).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
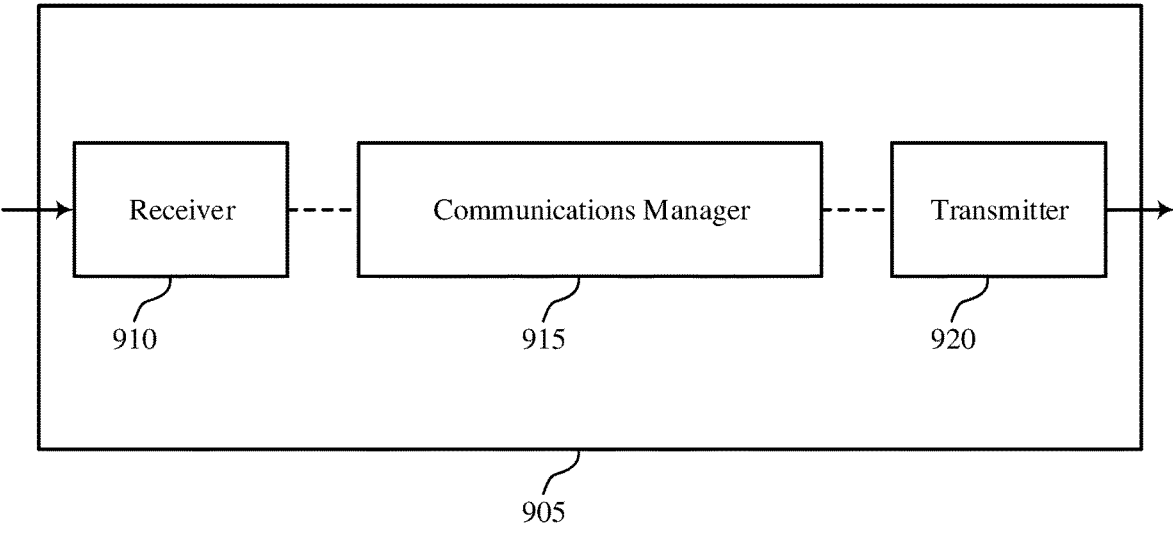
FIGS. 9 and 10 show block diagrams of devices that support signaling for activation of a bandwidth part in accordance with aspects of the present disclosure.

FIG. 9 shows a block diagram 900 of a device 905 that supports signaling for activation of a bandwidth part in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to signaling for activation of a bandwidth part, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that a UE, in communication with the base station operating as a master node, is configured with a communication link with a secondary node on a dormant bandwidth part and transmit, to the UE, downlink control information indicating a transition to an active bandwidth part for the communication link between the secondary node and the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
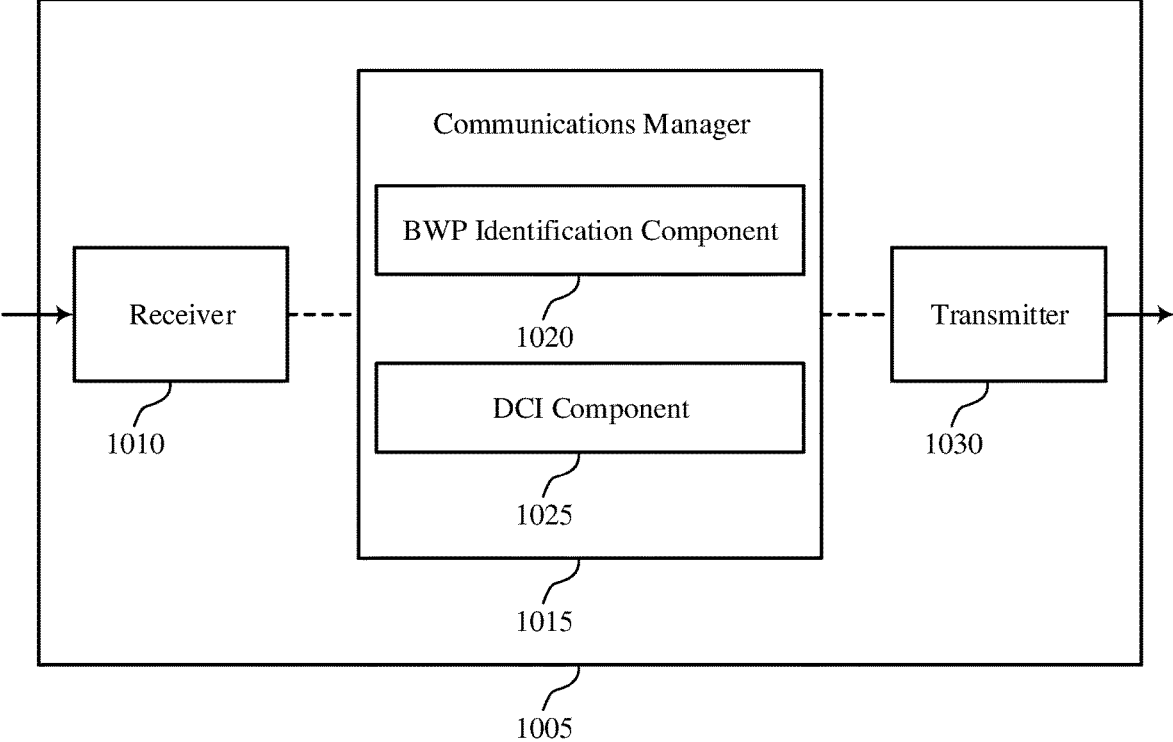

FIG. 10 shows a block diagram 1000 of a device 1005 that supports signaling for activation of a bandwidth part in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to signaling for activation of a bandwidth part, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a BWP identification component 1020 and a DCI component 1025. The communications manager 1015 may be an example of aspects of the communications manager 1210 described herein.

The BWP identification component 1020 may identify that a UE, in communication with the base station operating as a master node, is configured with a communication link with a secondary node on a dormant bandwidth part. The DCI component 1025 may transmit, to the UE, downlink control information indicating a transition to an active bandwidth part for the communication link between the secondary node and the UE.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
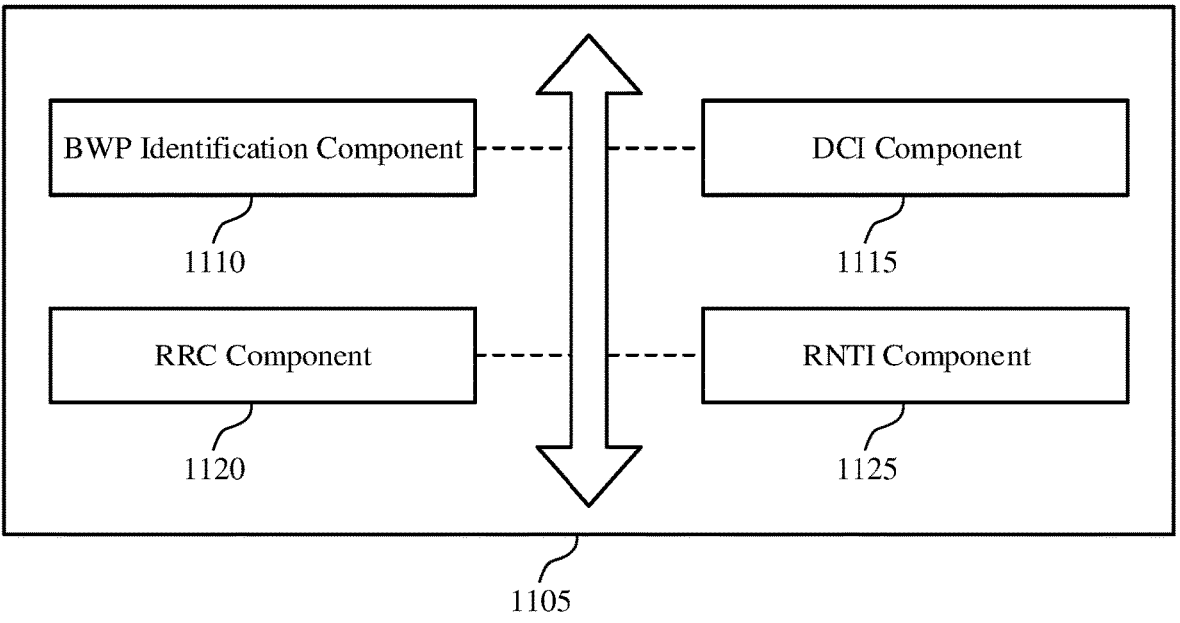
FIG. 11 shows a block diagram of a communications manager that supports signaling for activation of a bandwidth part in accordance with aspects of the present disclosure.

FIG. 11 shows a block diagram 1100 of a communications manager 1105 that supports signaling for activation of a bandwidth part in accordance with aspects of the present disclosure. The communications manager 1105 may be an example of aspects of a communications manager 915, a communications manager 1015, or a communications manager 1210 described herein. The communications manager 1105 may include a BWP identification component 1110, a DCI component 1115, a RRC component 1120, and a RNTI component 1125. Each of these modules may communicate, directly or indirectly, with one another (e.g., via one or more buses).

The BWP identification component 1110 may identify that a UE, in communication with the base station operating as a master node, is configured with a communication link with a secondary node on a dormant bandwidth part. The DCI component 1115 may transmit, to the UE, downlink control information indicating a transition to an active bandwidth part for the communication link between the secondary node and the UE.

In some examples, the DCI component 1115 may transmit, via the downlink control information, an activation indication signaling activation of a secondary cell group including a set of secondary cells, where the active bandwidth part corresponds to the activated secondary cell group associated with the secondary node.

In some examples, the DCI component 1115 may transmit, via the downlink control information, an activation indication signaling that each secondary cell within a set of secondary cells is active or inactive, where the active bandwidth part corresponds to an activated secondary cell within the set of secondary cells associated with the secondary node.

In some examples, the DCI component 1115 may transmit the downlink control information while the UE is in an active state. In some examples, the DCI component 1115 may transmit, while the UE is in an inactive state, the downlink control information as a wake up signal.

In some cases, the activation indication includes a bit signaling the activation of the secondary cell group. In some cases, the activation indication includes a bitmap including a bit for each secondary cell within the set of secondary cells.

In some cases, the downlink control information further includes a group indication that signals that the activation indication pertains to a secondary cell group including the set of secondary cells. In some cases, the group indication includes a bit indicating activation of the set of secondary cells including a secondary cell group.

The RRC component 1120 may transmit a radio resource control signal including a mapping indication of a mapping of a set of secondary cells to a secondary cell group, where the transmitted downlink control information includes the mapping indication to signal activation of the set of secondary cells of the secondary cell group, and where the active bandwidth part corresponds to an activated secondary cell within the secondary cell group associated with the secondary node.

In some examples, the RRC component 1120 may transmit a radio resource control signal including a mapping indication of a mapping of the set of secondary cells to a secondary cell group, where transmission of the radio network temporary identifier indicates that the downlink control information includes the activation indication signaling activation of the secondary cell group. In some examples, the RRC component 1120 may transmit a radio resource control signaling indicating a discontinuous reception pattern for one or more secondary cells associated with the activated bandwidth part.

The RNTI component 1125 may transmit a radio network temporary identifier that indicates that the downlink control information includes an activation indication signaling activation of a set of secondary cells, where the active bandwidth part corresponds to the activated set of secondary cells associated with the secondary node. In some cases, the radio network temporary identifier scrambles the downlink control information including the activation indication.

In some cases, the radio network temporary identifier includes a bit signaling that the downlink control information includes the activation indication. In some cases, the activation indication signals that each secondary cell within the set of secondary cells is active or inactive, where the active bandwidth part corresponds to an activated secondary cell within the set of secondary cells associated with the secondary node.

In some cases, the activation indication includes a bitmap including a bit for each secondary cell within the set of secondary cells.

In some cases, the radio network temporary identifier includes a bit signaling that the downlink control information includes the activation indication for the secondary cell group. In some cases, the radio network temporary identifier includes a bit signaling that the downlink control information includes the activation indication for the set of secondary cells including a secondary cell group.

Figure 12:
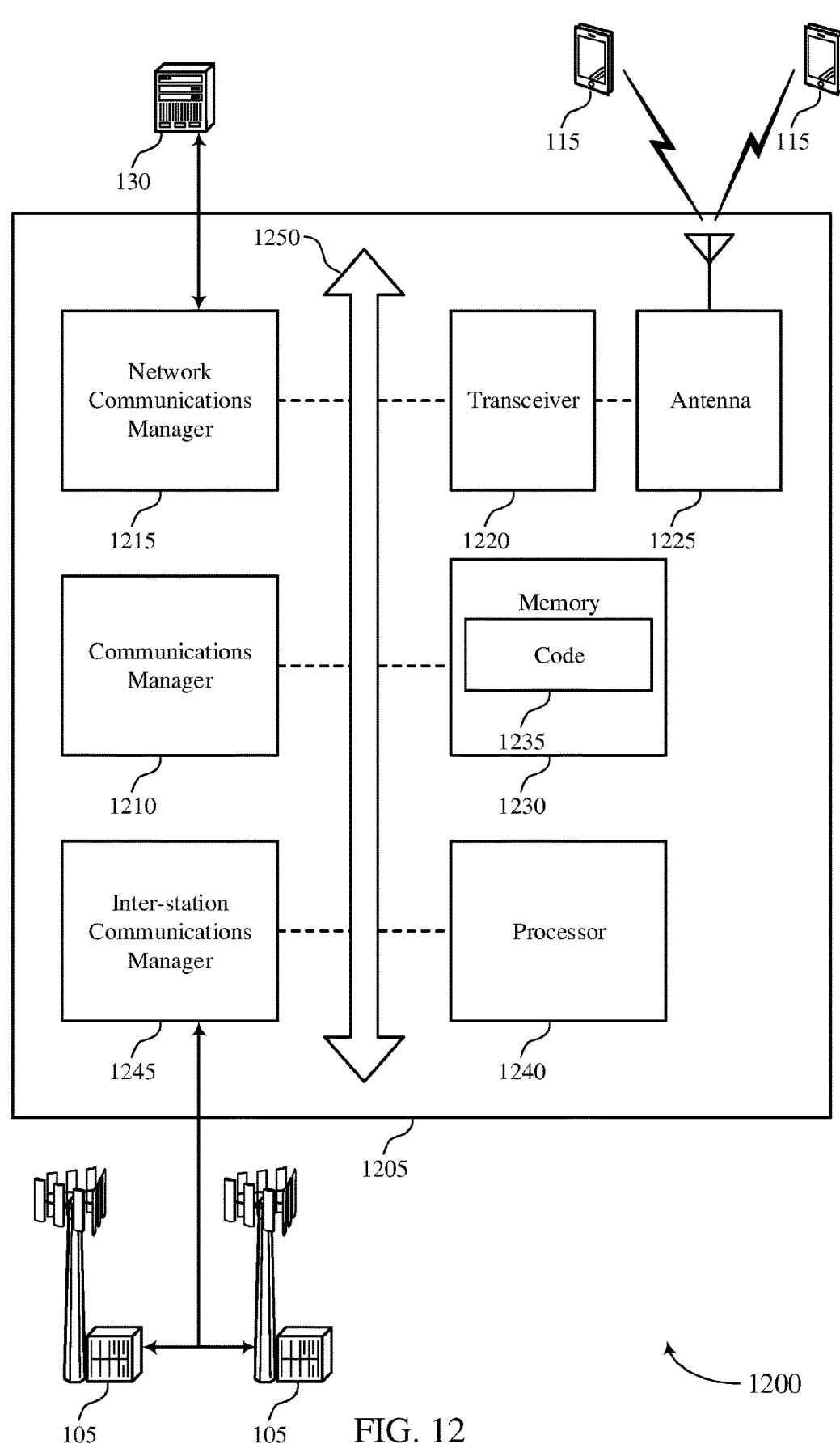
FIG. 12 shows a diagram of a system including a device that supports signaling for activation of a bandwidth part in accordance with aspects of the present disclosure.

FIG. 12 shows a diagram of a system 1200 including a device 1205 that supports signaling for activation of a bandwidth part in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify that a UE, in communication with the base station operating as a master node, is configured with a communication link with a secondary node on a dormant bandwidth part and transmit, to the UE, downlink control information indicating a transition to an active bandwidth part for the communication link between the secondary node and the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting signaling for activation of a bandwidth part).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

FIG. 13 shows a flowchart illustrating a method 1300 that supports signaling for activation of a bandwidth part in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is configured with a communication link with a secondary node on a dormant bandwidth part. The operations of 1305 may be performed according to the methods described herein. In some examples, aspects of the operations of 1305 may be performed by a BWP identification component as described with reference to FIGS. 5 through 8.

At 1310, the UE may receive, from a master node, downlink control information indicating a transition to an active bandwidth part for the communication link with the secondary node. The operations of 1310 may be performed according to the methods described herein. In some examples, aspects of the operations of 1310 may be performed by a DCI component as described with reference to FIGS. 5 through 8.

At 1315, the UE may perform a communication with the secondary node on the active bandwidth part in accordance with the downlink control information. The operations of 1315 may be performed according to the methods described herein. In some examples, aspects of the operations of 1315 may be performed by a communication interface as described with reference to FIGS. 5 through 8.

Figure 14:
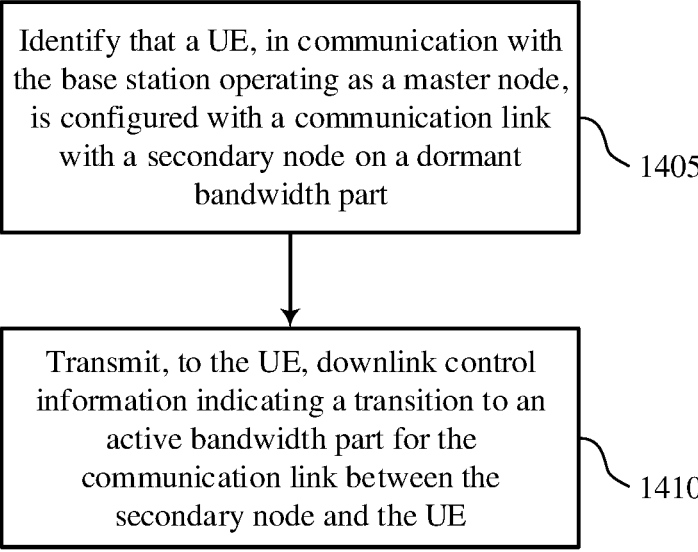

FIG. 14 shows a flowchart illustrating a method 1400 that supports signaling for activation of a bandwidth part in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may identify that a UE, in communication with the base station operating as a master node, is configured with a communication link with a secondary node on a dormant bandwidth part. The operations of 1405 may be performed according to the methods described herein. In some examples, aspects of the operations of 1405 may be performed by a BWP identification component as described with reference to FIGS. 9 through 12.

At 1410, the base station may transmit, to the UE, downlink control information indicating a transition to an active bandwidth part for the communication link between the secondary node and the UE. The operations of 1410 may be performed according to the methods described herein. In some examples, aspects of the operations of 1410 may be performed by a DCI component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present invention:

Aspect 1: A method for wireless communications, comprising: identifying that the UE is configured with a communication link with a secondary node on a dormant bandwidth part; receiving, from a master node, downlink control information indicating a transition to an active bandwidth part for the communication link with the secondary node; and performing a communication with the secondary node on the active bandwidth part in accordance with the downlink control information.

Aspect 2: The method of aspect 1, wherein receiving the downlink control information comprises: receiving, via the downlink control information, an activation indication signaling activation of a secondary cell group comprising a set of secondary cells, wherein the active bandwidth part corresponds to the activated secondary cell group associated with the secondary node.

Aspect 3: The method of aspect 2, wherein the activation indication comprises a bit signaling the activation of the secondary cell group.

Aspect 4: The method of any one of aspects 1 through 3, wherein receiving the downlink control information comprises: receiving, via the downlink control information, an activation indication signaling that each secondary cell within a set of secondary cells is active or inactive, wherein the active bandwidth part corresponds to an activated secondary cell within the set of secondary cells associated with the secondary node.

Aspect 5: The method of any one of aspects 3 through 4, wherein the activation indication comprises a bitmap including a bit for each secondary cell within the set of secondary cells.

Aspect 6: The method of any one of aspects 4 through 5, wherein the downlink control information further includes a group indication that signals that the activation indication pertains to a secondary cell group comprising the set of secondary cells.

Aspect 7: The method of aspect 6, wherein the group indication comprises a bit indicating activation of the secondary cell group.

Aspect 8: The method of any one of aspects 1 through 7, further comprising: receiving a radio resource control signal including a mapping indication of a mapping of a set of secondary cells to a secondary cell group, wherein the received downlink control information includes the mapping indication to signal activation of the set of secondary cells of the secondary cell group, and wherein the active bandwidth part corresponds to an activated secondary cell within the secondary cell group associated with the secondary node.

Aspect 9: The method of any one of aspects 1 through 8, further comprising: receiving a radio network temporary identifier that indicates that the downlink control information includes an activation indication signaling activation of a set of secondary cells, wherein the active bandwidth part corresponds to the activated set of secondary cells associated with the secondary node.

Aspect 10: The method of aspect 9, wherein the radio network temporary identifier scrambles the downlink control information including the activation indication.

Aspect 11: The method of any one of aspects 9 through 10, wherein the radio network temporary identifier includes a bit signaling that the downlink control information includes the activation indication.

Aspect 12: The method of any one of aspects 9 through 11, wherein the activation indication signals that each secondary cell within the set of secondary cells is active or inactive, the active bandwidth part corresponds to an activated secondary cell within the set of secondary cells associated with the secondary node.

Aspect 13: The method of aspect 12, wherein the activation indication comprises a bitmap including a bit for each secondary cell within the set of secondary cells.

Aspect 14: The method of any one of aspects 9 through 13, further comprising: receiving a radio resource control signal including a mapping indication of a mapping of the set of secondary cells to a secondary cell group, wherein receipt of the radio network temporary identifier indicates that the downlink control information includes the activation indication signaling activation of the secondary cell group.

Aspect 15: The method of aspect 14, wherein the radio network temporary identifier scrambles the downlink control information including the activation indication.

Aspect 16: The method of any one of aspects 14 through 15, wherein the radio network temporary identifier includes a bit signaling that the downlink control information includes the activation indication for the secondary cell group.

Aspect 17: The method of any one of aspects 1 through 16, wherein receiving the downlink control information comprises: receiving the downlink control information while the UE is in an active state.

Aspect 18: The method of any one of aspects 1 through 16, wherein receiving the downlink control information comprises: receiving, while the UE is in an inactive state, the downlink control information as a wake up signal, wherein the UE transitions to an active state upon receipt of the wake up signal.

Aspect 19: The method of aspect 18, further comprising: receiving a radio resource control signal including a mapping indication of a mapping of a set of secondary cells to a secondary cell group, wherein the received downlink control information includes the mapping indication to signal activation of the set of secondary cells of the secondary cell group, and wherein the active bandwidth part corresponds to an activated secondary cell within the secondary cell group associated with the secondary node.

Aspect 20: The method of any one of aspects 18 through 19, further comprising: receiving a radio network temporary identifier that indicates that the downlink control information includes an activation indication signaling activation of a set of secondary cells, wherein the active bandwidth part corresponds to the activated set of secondary cells associated with the secondary node.

Aspect 21: The method of aspect 20, wherein the radio network temporary identifier scrambles the downlink control information including the activation indication.

Aspect 22: The method of any one of aspects 20 through 21, wherein the radio network temporary identifier includes a bit signaling that the downlink control information includes the activation indication for the set of secondary cells comprising a secondary cell group.

Aspect 23: The method of any one of aspects 1 through 22, wherein performing the communication with the secondary node comprises: monitoring a physical downlink control channel on the activated bandwidth part.

Aspect 24: The method of any one of aspects 1 through 23, wherein identifying that the UE is configured with the communication link with the secondary node on the dormant bandwidth part comprises: performing one or more cell quality measurements; and transmitting the one or more cell quality measurements to the secondary node.

Aspect 25: The method of any one of aspects 1 through 24, wherein receiving the downlink control information comprises: performing a blind decoding on a physical downlink control channel comprising the downlink control information, wherein each blinding decoding attempt contributes to a blind decoding limit configured at the UE.

Aspect 26: The method of any one of aspects 1 through 25, further comprising: delaying the communication with the secondary node on the active bandwidth part by a predetermined threshold in response to receiving the indication of the transition.

Aspect 27: The method of any one of aspects 1 through 26, further comprising: receiving a radio resource control signaling indicating a discontinuous reception pattern for one or more secondary cells associated with the activated bandwidth part, wherein the communication is performed with the secondary node on the active bandwidth part in accordance with the discontinuous reception pattern.

Aspect 28: A method for wireless communications at a base station, comprising: identifying that a user equipment (UE), in communication with the base station operating as a master node, is configured with a communication link with a secondary node on a dormant bandwidth part; and transmitting, to the UE, downlink control information indicating a transition to an active bandwidth part for the communication link between the secondary node and the UE.

Aspect 29: The method of aspect 28, wherein transmitting the downlink control information comprises: transmitting, via the downlink control information, an activation indication signaling activation of a secondary cell group comprising a set of secondary cells, wherein the active bandwidth part corresponds to the activated secondary cell group associated with the secondary node.

Aspect 30: The method of aspect 29, wherein the activation indication comprises a bit signaling the activation of the secondary cell group.

Aspect 31: The method of any one of aspects 28 through 30, wherein transmitting the downlink control information comprises: transmitting, via the downlink control information, an activation indication signaling that each secondary cell within a set of secondary cells is active or inactive, wherein the active bandwidth part corresponds to an activated secondary cell within the set of secondary cells associated with the secondary node.

Aspect 32: The method of aspect 31, wherein the activation indication comprises a bitmap including a bit for each secondary cell within the set of secondary cells.

Aspect 33: The method of any one of aspects 31 through 32, wherein the downlink control information further includes a group indication that signals that the activation indication pertains to a secondary cell group comprising the set of secondary cells.

Aspect 34: The method of aspect 33, wherein the group indication comprises a bit signaling activation of the set of secondary cells comprising a secondary cell group.

Aspect 35: The method of any one of aspects 28 through 34, further comprising: transmitting a radio resource control signal including a mapping indication of a mapping of a set of secondary cells to a secondary cell group, wherein the transmitted downlink control information includes the mapping indication to signal activation of the set of secondary cells of the secondary cell group, and wherein the active bandwidth part corresponds to an activated secondary cell within the secondary cell group associated with the secondary node.

Aspect 36: The method of any one of aspects 28 through 35, further comprising: transmitting a radio network temporary identifier that indicates that the downlink control information includes an activation indication signaling activation of a set of secondary cells, wherein the active bandwidth part corresponds to the activated set of secondary cells associated with the secondary node.

Aspect 37: The method of aspect 36, wherein the radio network temporary identifier scrambles the downlink control information including the activation indication.

Aspect 38: The method of any one of aspects 36 through 37, wherein the radio network temporary identifier includes a bit signaling that the downlink control information includes the activation indication.

Aspect 39: The method of any one of aspects 36 through 38, wherein the activation indication signals that each secondary cell within the set of secondary cells is active or inactive, the active bandwidth part corresponds to an activated secondary cell within the set of secondary cells associated with the secondary node.

Aspect 40: The method of aspect 39, wherein the activation indication comprises a bitmap including a bit for each secondary cell within the set of secondary cells.

Aspect 41: The method of any one of aspects 36 through 40, further comprising: transmitting a radio resource control signal including a mapping indication of a mapping of the set of secondary cells to a secondary cell group, wherein transmission of the radio network temporary identifier indicates that the downlink control information includes the activation indication signaling activation of the secondary cell group.

Aspect 42: The method of aspect 41, wherein the radio network temporary identifier scrambles the downlink control information including the activation indication.

Aspect 43: The method of any one of aspects 41 through 42, wherein the radio network temporary identifier includes a bit signaling that the downlink control information includes the activation indication for the secondary cell group.

Aspect 44: The method of any one of aspects 28 through 43, wherein transmitting the downlink control information comprises: transmitting the downlink control information while the UE is in an active state.

Aspect 45: The method of any one of aspects 28 through 44, wherein transmitting the downlink control information comprises: transmitting, while the UE is in an inactive state, the downlink control information as a wake up signal.

Aspect 46: The method of aspect 45, further comprising: transmitting a radio resource control signal including a mapping indication of a mapping of a set of secondary cells to a secondary cell group, wherein the transmitted downlink control information includes the mapping indication to signal activation of the set of secondary cells of the secondary cell group, and wherein the active bandwidth part corresponds to an activated secondary cell within the secondary cell group associated with the secondary node.

Aspect 47: The method of any one of aspects 45 through 46, further comprising: transmitting a radio network temporary identifier that indicates that the downlink control information includes an activation indication signaling activation of a set of secondary cells, wherein the active bandwidth part corresponds to the activated set of secondary cells associated with the secondary node.

Aspect 48: The method of aspect 47, wherein the radio network temporary identifier scrambles the downlink control information including the activation indication.

Aspect 49: The method of any one of aspects 47 through 48, wherein the radio network temporary identifier includes a bit signaling that the downlink control information includes the activation indication for the set of secondary cells comprising a secondary cell group.

Aspect 50: The method of any one of aspects 28 through 49, further comprising: transmitting a radio resource control signaling indicating a discontinuous reception pattern for one or more secondary cells associated with the activated bandwidth part.

Aspect 51: An apparatus for wireless communications comprising at least one means for performing a method of any one of aspects 1 through 27.

Aspect 52: An apparatus for wireless communications comprising a processor and memory coupled to the processor, the processor and memory configured to perform a method of any one of aspects 1 through 27.

Aspect 53: A non-transitory computer-readable medium storing code for wireless communications the code comprising instructions executable by a processor to perform a method of any one of aspects 1 through 27.

Aspect 54: An apparatus for wireless communications at a base station comprising at least one means for performing a method of any one of aspects 28 through 50.

Aspect 55: An apparatus for wireless communications at a base station comprising a processor and memory coupled to the processor, the processor and memory configured to perform a method of any one of aspects 28 through 50.

Aspect 56: A non-transitory computer-readable medium storing code for wireless communications at a base station the code comprising instructions executable by a processor to perform a method of any one of aspects 28 through 50.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying that the UE is configured with a communication link with a secondary node on a dormant bandwidth part such that a secondary cell group associated with the secondary node and comprising a set of secondary cells is dormant;
   receiving, from a master node different from the secondary node, downlink control information comprising an activation indication that signals activation of the secondary cell group for the communication link with the secondary node, wherein the activation indication comprises both a group indication that signals that the activation indication pertains to the secondary cell group comprising the set of secondary cells and a bitmap that signals whether each secondary cell within the set of secondary cells associated with the secondary node is active or inactive;
   receiving a radio network temporary identifier that indicates that the downlink control information includes the activation indication signaling activation of the secondary cell group comprising the set of secondary cells, wherein the radio network temporary identifier includes a bit signaling that the downlink control information includes the activation indication; and
   performing a communication with the secondary node on an active bandwidth part of the secondary cell group in accordance with the downlink control information, wherein the active bandwidth part corresponds to an activated secondary cell within the set of secondary cells associated with the secondary node.

2. The method of claim 1, wherein the group indication comprises a bit signaling the activation of the secondary cell group.

3. The method of claim 1, wherein the bitmap includes a bit for each secondary cell within the set of secondary cells.

4. The method of claim 1, further comprising:
   receiving a radio resource control signal including a mapping indication of a mapping of the set of secondary cells to the secondary cell group, wherein the received downlink control information includes the mapping indication to signal activation of the set of secondary cells of the secondary cell group, and wherein the active bandwidth part corresponds to the activated secondary cell within the secondary cell group associated with the secondary node.

5. The method of claim 1, wherein the radio network temporary identifier scrambles the downlink control information including the activation indication.

6. The method of claim 1, wherein the activation indication signals whether each secondary cell within the set of secondary cells is active or inactive, wherein the active bandwidth part corresponds to the activated secondary cell within the secondary cell group associated with the secondary node.

7. The method of claim 1, further comprising:
   receiving a radio resource control signal including a mapping indication of a mapping of the set of secondary cells to the secondary cell group, wherein receipt of the radio network temporary identifier indicates that the downlink control information includes the activation indication signaling activation of the secondary cell group.

8. The method of claim 7, wherein the radio network temporary identifier scrambles the downlink control information including the activation indication.

9. The method of claim 1, wherein receiving the downlink control information comprises:
   receiving the downlink control information while the UE is in an active state.

10. The method of claim 1, wherein receiving the downlink control information comprises:

receiving, while the UE is in an inactive state, the downlink control information as a wake up signal, wherein the UE transitions to an active state after receipt of the wake up signal.

11. The method of claim 10, further comprising:

receiving a radio resource control signal including a mapping indication of a mapping of the set of secondary cells to the secondary cell group, wherein the received downlink control information includes the mapping indication to signal activation of the set of secondary cells of the secondary cell group, and wherein the active bandwidth part corresponds to the activated secondary cell within the secondary cell group associated with the secondary node.

12. The method of claim 10, wherein the radio network temporary identifier scrambles the downlink control information including the activation indication.

13. The method of claim 1, wherein performing the communication with the secondary node comprises:

monitoring a physical downlink control channel on the active bandwidth part.

14. The method of claim 1, wherein identifying that the UE is configured with the communication link with the secondary node on the dormant bandwidth part comprises:

performing one or more cell quality measurements; and transmitting the one or more cell quality measurements to the secondary node.

15. The method of claim 1, wherein receiving the downlink control information comprises:

performing a blind decoding on a physical downlink control channel comprising the downlink control information, wherein each blinding decoding attempt contributes to a blind decoding limit configured at the UE.

16. The method of claim 1, further comprising:

delaying the communication with the secondary node on the active bandwidth part by a predetermined threshold in response to receiving the activation indication.

17. The method of claim 1, further comprising:

receiving a radio resource control signaling indicating a discontinuous reception pattern for one or more secondary cells associated with the active bandwidth part, wherein the communication is performed with the secondary node on the active bandwidth part in accordance with the discontinuous reception pattern.

18. An apparatus for wireless communications at a user equipment (UE), comprising:

one or more processors, one or more memories coupled with the one or more processors; and instructions stored in the one or more memories and executable by the one or more processors to cause the apparatus to:

identify that the UE is configured with a communication link with a secondary node on a dormant bandwidth part such that a secondary cell group associated with the secondary node and comprising a set of secondary cells is dormant;

receive, from a master node different from the secondary node, downlink control information comprising an activation indication that signals activation of the secondary cell group for the communication link with the secondary node, wherein the activation indication comprises both a group indication that signals that the activation indication pertains to the secondary cell group comprising the set of secondary cells and a bitmap that signals whether each secondary cell within the set of secondary cells associated with the secondary node is active or inactive;

receive a radio network temporary identifier that indicates that the downlink control information includes the activation indication signaling activation of the secondary cell group comprising the set of secondary cells, wherein the radio network temporary identifier includes a bit signaling that the downlink control information includes the activation indication; and perform a communication with the secondary node on an active bandwidth part of the secondary cell group in accordance with the downlink control information, wherein the active bandwidth part corresponds to an activated secondary cell within the set of secondary cells associated with the secondary node.

19. An apparatus for wireless communications at a user equipment (UE), comprising:

means for identifying that the UE is configured with a communication link with a secondary node on a dormant bandwidth part such that a secondary cell group associated with the secondary node and comprising a set of secondary cells is dormant;

means for receiving, from a master node different from the secondary node, downlink control information comprising an activation indication that signals activation of the secondary cell group for the communication link with the secondary node, wherein the activation indication comprises both a group indication that signals that the activation indication pertains to the secondary cell group comprising the set of secondary cells and a bitmap that signals whether each secondary cell within the set of secondary cells associated with the secondary node is active or inactive;

means for receiving a radio network temporary identifier that indicates that the downlink control information includes the activation indication signaling activation of the secondary cell group comprising the set of secondary cells, wherein the radio network temporary identifier includes a bit signaling that the downlink control information includes the activation indication; and means for performing a communication with the secondary node on an active bandwidth part of the secondary cell group in accordance with the downlink control information, wherein the active bandwidth part corresponds to an activated secondary cell within the set of secondary cells associated with the secondary node.

20. A non-transitory computer-readable medium storing code for wireless communications at a user equipment (UE), the code comprising instructions executable by one or more processors to:

identify that the UE is configured with a communication link with a secondary node on a dormant bandwidth part such that a secondary cell group associated with the secondary node and comprising a set of secondary cells is dormant;

receive, from a master node different from the secondary node, downlink control information comprising an activation indication that signals activation of the secondary cell group for the communication link with the secondary node, wherein the activation indication comprises both a group indication that signals that the activation indication pertains to the secondary cell group comprising the set of secondary cells and a bitmap that signals whether each secondary cell within the set of secondary cells associated with the secondary node is active or inactive;

receive a radio network temporary identifier that indicates that the downlink control information includes the activation indication signaling activation of the secondary cell group comprising the set of secondary cells, wherein the radio network temporary identifier includes a bit signaling that the downlink control information includes the activation indication; and perform a communication with the secondary node on an active bandwidth part of the secondary cell group in accordance with the downlink control information, wherein the active bandwidth part corresponds to an activated secondary cell within the set of secondary cells associated with the secondary node.

\* \* \* \* \*